(12) United States Patent
John Wilson et al.

(10) Patent No.: US 10,707,923 B2
(45) Date of Patent: Jul. 7, 2020

(54) DYNAMIC TRANSMISSION CONFIGURATION INDICATION STATE UPDATING

(71) Applicant: QUALCOMM Incorporated, San Diego, CA (US)

(72) Inventors: Makesh Pravin John Wilson, San Diego, CA (US); Tao Luo, San Diego, CA (US); Sony Akkarakaran, Poway, CA (US); Sumeeth Nagaraja, San Diego, CA (US); Xiao Feng Wang, San Diego, CA (US); Juan Montojo, San Diego, CA (US); Shengbo Chen, San Diego, CA (US); Wooseok Nam, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/158,272

(22) Filed: Oct. 11, 2018

(65) Prior Publication Data
US 2019/0115955 A1   Apr. 18, 2019

Related U.S. Application Data

(60) Provisional application No. 62/572,270, filed on Oct. 13, 2017.

(51) Int. Cl.
*H04W 72/04* (2009.01)
*H04B 7/024* (2017.01)
(Continued)

(52) U.S. Cl.
CPC ............ *H04B 7/024* (2013.01); *H04B 7/022* (2013.01); *H04B 7/0626* (2013.01); *H04B 7/088* (2013.01);
(Continued)

(58) Field of Classification Search
CPC .. H04L 5/0048; H04L 5/0023; H04W 72/042; H04W 76/27
See application file for complete search history.

(56) References Cited

PUBLICATIONS

Samsung, "On Beam Indication," 3GPP Draft, R1-1717627, Oct. 8, 2017, 9 pages; cited in IDS. filed on Apr. 9, 2019 (Year: 2017).*
(Continued)

*Primary Examiner* — Jamal Javaid
(74) *Attorney, Agent, or Firm* — Holland & Hart LLP/Qualcomm

(57) ABSTRACT

Methods, systems, and devices for wireless communications are described. In some wireless communications systems, a base station may communicate with a user equipment (UE) using multiple antennas. Data streams may be mapped to the antennas using antenna ports. In some cases, a base station may transmit a transmission configuration indication (TCI) to a UE to indicate quasi co-location (QCL) relationships between antenna ports used for downlink communication with a UE. The UE may use these QCL relationships to identify appropriate techniques for decoding a downlink transmission from the base station. In some cases, it may be appropriate for a base station to update one or more TCI states configured for indicating, to a UE, QCL relationships between antenna ports used for downlink communication with the UE. As described herein, a base station may support techniques for dynamically updating such TCI states (e.g., via downlink control information (DCI) signaling).

28 Claims, 14 Drawing Sheets

(51) Int. Cl.
  *H04L 5/00*     (2006.01)
  *H04B 7/08*     (2006.01)
  *H04B 7/022*    (2017.01)
  *H04W 4/70*     (2018.01)
  *H04W 76/27*    (2018.01)
  *H04B 7/06*     (2006.01)
  *H04W 4/20*     (2018.01)
  *H04W 80/02*    (2009.01)

(52) U.S. Cl.
  CPC .......... *H04L 5/0023* (2013.01); *H04L 5/0048* (2013.01); *H04L 5/0055* (2013.01); *H04L 5/0096* (2013.01); *H04W 4/70* (2018.02); *H04W 72/042* (2013.01); *H04W 76/27* (2018.02); *H04L 5/005* (2013.01); *H04W 4/20* (2013.01); *H04W 80/02* (2013.01)

(56) References Cited

PUBLICATIONS

Fujitsu: "Discussion on beam indication", 3GPP Draft, R1-1717716 Discussion on Beam Indication Final, 3rd Generation Partnership Project (3GPP), Mobile Competence Centre, 650, Route Des Lucioles, F-06921 Sophia-Antipolis Cedex, France, vol. RAN WG1, No. Prague, Czech Republic, 20171009-20171013, Oct. 8, 2017 (Oct. 8, 2017), XP051340901, 4 Pages, Retrieved from the Internet: URL:http://www.3gpp.org/ftp/Meetings_3GPP_SYNC/RAN1/Docs/ [retrieved on Oct. 8, 2017].

International Search Report and Written Opinion—PCT/US2018/055584—ISA/EPO—dated Jan. 24, 2019.

Qualcomm Incorporated: "Discussion on QCL", 3GPP Draft, R1-1718551, 3rd Generation Partnership Project (3GPP), Mobile Competence Centre, 650, Route Des Lucioles, F-06921 Sophia-Antipolis Cedex, France, vol. RAN WG1, No. Prague, Czech, 20171009-20171013, Oct. 8, 2017 (Oct. 8, 2017), XP051341732, 9 Pages, Retrieved from the Internet: URL:http://www.3gpp.org/ftp/Meetings_3GPP SYNC/RAN1/docs/ [retrieved on Oct. 8, 2017].

Samsung: "On Beam Indication", 3GPP Draft, R1-1717627 On Beam Indication_V1, 3rd Generation Partnership Project (3GPP), Mobile Competence Centre, 650, Route Des Lucioles, F-06921 Sophia-Antipolis Cedex, France, vol. RAN WG1, No. Prague, CZ, 20171009-20171013, Oct. 8, 2017 (Oct. 8, 2017), XP051340813, 9 Pages, Retrieved from the Internet: URL:http://www.3gpp.org/ftp/Meetings_3GPP SYNC/RAN1/Docs/ [retrieved on Oct. 8, 2017].

* cited by examiner

DYNAMIC TRANSMISSION CONFIGURATION INDICATION STATE UPDATING

CROSS REFERENCES

The present Application for patent claims the benefit of U.S. Provisional Patent Application No. 62/572,270 by JOHN WILSON, et al., entitled "DYNAMIC TRANSMISSION CONFIGURATION INDICATION STATE UPDATING," filed Oct. 13, 2017, assigned to the assignee hereof and expressly incorporated by reference in its entirety.

BACKGROUND

The following relates generally to wireless communication and more specifically to dynamic transmission configuration indication (TCI) state updating.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may communicate with a UE using multiple antennas. Data streams may be mapped to one or more antennas using antenna ports, and each of these antenna ports may be associated with a reference signal (e.g., which may allow a receiver to distinguish data streams associated with different antenna ports in a received transmission). In some cases, some antenna ports may be referred to as quasi co-located, meaning that the spatial parameters associated with a transmission on one antenna port may be inferred from the spatial parameters associated with another transmission on a different antenna port. This implicit relationship between antenna ports may improve the chances that a UE is able to successfully decode a downlink transmission. For example, a receiving device (e.g., a UE) may be able to perform channel estimation for demodulating data received on a first set of antenna ports based on reference signals received on a second set of antenna ports that are quasi co-located with the first set of antenna ports. Conventional techniques for signaling, to a UE, quasi co-location (QCL) relationships between different antenna ports are inefficient and degrade the reliability of communications in a wireless communications system.

SUMMARY

In some wireless communications systems, a base station may communicate with a user equipment (UE) using multiple antennas. Data streams may be mapped to the antennas using antenna ports. In some cases, a base station may transmit an indication to a UE of the quasi co-location (QCL) relationships between antenna ports used for downlink communications with the UE. Such an indication may be referred to as a transmission configuration indication (TCI). Accordingly, if a UE identifies that a first set of antenna ports are quasi co-located with a second set of antenna ports based on the received TCI, the UE may use reference signals transmitted on the first set of antenna ports (e.g., in addition to reference signals transmitted on the second set of antenna ports) to perform channel estimation for demodulating data received on the second set of antenna ports.

The UE may then be able to successfully decode the downlink transmission received from a base station on the second set of antenna ports based on a channel estimate obtained from the channel estimation procedure. Different TCI states may correspond to different QCL relationships between antenna ports used for downlink communication with a UE. In some cases, (e.g., due to changing channel conditions), it may be appropriate for a base station to update one or more TCI states configured for indicating, to a UE, QCL relationships between antenna ports used for downlink communication with the UE. As described herein, a base station may support techniques for dynamically updating a subset of TCI states configured for indicating, to a UE, QCL relationships between antenna ports used for downlink communications with the UE. In particular, the base station may transmit downlink control information (DCI) to the UE to update the subset of TCI states (e.g., based on current channel conditions).

A method for wireless communication at a UE is described. The method may include identifying a set of TCI states that indicate QCL relationships between antenna ports used for communicating with a base station, receiving, from the base station, DCI indicating an update to a subset of the set of TCI states, the updated subset of the set of TCI states indicating updated QCL relationships between antenna ports used for communicating with the base station, and communicating with the base station based on the updated subset of the set of TCI states.

An apparatus for wireless communication at a UE is described. The apparatus may include means for identifying a set of TCI states that indicate QCL relationships between antenna ports used for communicating with a base station, means for receiving, from the base station, DCI indicating an update to a subset of the set of TCI states, the updated subset of the set of TCI states indicating updated QCL relationships between antenna ports used for communicating with the base station, and means for communicating with the base station based on the updated subset of the set of TCI states.

Another apparatus for wireless communication at a UE is described. The apparatus may include a processor, memory in electronic communication with the processor, and instructions stored in the memory. The instructions may be operable to cause the processor to identify a set of TCI states that indicate QCL relationships between antenna ports used for communicating with a base station, receive, from the base station, DCI indicating an update to a subset of the set of TCI states, the updated subset of the set of TCI states indicating updated QCL relationships between antenna ports used for communicating with the base station, and communicate with the base station based on the updated subset of the set of TCI states.

A non-transitory computer-readable medium for wireless communication at a UE is described. The non-transitory computer-readable medium may include instructions operable to cause a processor to identify a set of TCI states that indicate QCL relationships between antenna ports used for communicating with a base station, receive, from the base station, DCI indicating an update to a subset of the set of TCI states, the updated subset of the set of TCI states indicating updated QCL relationships between antenna ports used for communicating with the base station, and communicate with the base station based on the updated subset of the set of TCI states.

Some examples of the method, apparatus, and non-transitory computer-readable medium described above may further include processes, features, means, or instructions for receiving, from the base station, an indication of the set of TCI states that indicate QCL relationships between antenna ports used for communicating with the base station. In some examples of the method, apparatus, and non-transitory computer-readable medium described above, the indication may be received in radio resource control (RRC) signaling or in a media access control (MAC) control element (MAC-CE).

Some examples of the method, apparatus, and non-transitory computer-readable medium described above may further include processes, features, means, or instructions for determining whether to transmit an indication as to whether the DCI was received, the determining based on the subset of the set of TCI states to be updated. Some examples of the method, apparatus, and non-transitory computer-readable medium described above may further include processes, features, means, or instructions for transmitting, to the base station, an indication as to whether the DCI was received based on the determining.

Some examples of the method, apparatus, and non-transitory computer-readable medium described above may further include processes, features, means, or instructions for refraining from transmitting, to the base station, an indication as to whether the DCI was received based on the determining. In some examples of the method, apparatus, and non-transitory computer-readable medium described above, a time period associated with activating the updated subset of the set of TCI states may be based on the determining.

Some examples of the method, apparatus, and non-transitory computer-readable medium described above may further include processes, features, means, or instructions for receiving, from the base station, an indication of a TCI state in a DCI message in a transmission time interval (TTI), the TCI state indicating QCL relationships between antenna ports used for communicating with the base station in the TTI. In some examples of the method, apparatus, and non-transitory computer-readable medium described above, the TCI state may be associated with one or more reference signals, and the antenna ports used to transmit the one or more reference signals in the TTI may be quasi co-located with antenna ports used to transmit data to the UE in the TTI. In some examples of the method, apparatus, and non-transitory computer-readable medium described above, the one or more reference signals include synchronization signal blocks (SSBs), periodic channel state information reference signals (CSI-RSs), aperiodic CSI-RSs, semi-persistent CSI-RSs, or any combination thereof.

In some examples of the method, apparatus, and non-transitory computer-readable medium described above, the TCI state may be associated with one or more reference signals, and the antenna ports used to transmit the one or more reference signals may be quasi co-located with antenna ports used to transmit control information to the UE in the TTI. In some examples of the method, apparatus, and non-transitory computer-readable medium described above, the one or more reference signals include SSBs, periodic CSI-RSs, aperiodic CSI-RSs, semi-persistent CSI-RSs, or any combination thereof.

In some examples of the method, apparatus, and non-transitory computer-readable medium described above, the DCI may be received in a physical downlink control channel (PDCCH). In some examples of the method, apparatus, and non-transitory computer-readable medium described above, the DCI may be received in a MAC-CE in a PDCCH and a physical downlink shared channel (PDSCH).

A method for wireless communication at a base station is described. The method may include identifying a set of TCI states that indicate QCL relationships between antenna ports used for communicating with a UE, determining a subset of the set of TCI states to update, the updated subset of the set of TCI states indicating updated QCL relationships between antenna ports used for communicating with the UE, and transmitting DCI to the UE that identifies the subset of the set of TCI states to update based on the determining.

An apparatus for wireless communication at a base station is described. The apparatus may include means for identifying a set of TCI states that indicate QCL relationships between antenna ports used for communicating with a UE, means for determining a subset of the set of TCI states to update, the updated subset of the set of TCI states indicating updated QCL relationships between antenna ports used for communicating with the UE, and means for transmitting DCI to the UE that identifies the subset of the set of TCI states to update based on the determining.

Another apparatus for wireless communication at a base station is described. The apparatus may include a processor, memory in electronic communication with the processor, and instructions stored in the memory. The instructions may be operable to cause the processor to identify a set of TCI states that indicate QCL relationships between antenna ports used for communicating with a UE, determine a subset of the set of TCI states to update, the updated subset of the set of TCI states indicating updated QCL relationships between antenna ports used for communicating with the UE, and transmit DCI to the UE that identifies the subset of the set of TCI states to update based on the determining.

A non-transitory computer-readable medium for wireless communication at a base station is described. The non-transitory computer-readable medium may include instructions operable to cause a processor to identify a set of TCI states that indicate QCL relationships between antenna ports used for communicating with a UE, determine a subset of the set of TCI states to update, the updated subset of the set of TCI states indicating updated QCL relationships between antenna ports used for communicating with the UE, and transmit DCI to the UE that identifies the subset of the set of TCI states to update based on the determining.

Some examples of the method, apparatus, and non-transitory computer-readable medium described above may further include processes, features, means, or instructions for transmitting, to the UE, an indication of the set of TCI states that indicate QCL relationships between antenna ports used for communicating with the UE. In some examples of the method, apparatus, and non-transitory computer-readable medium described above, the indication may be transmitted in RRC signaling or in a MAC-CE.

Some examples of the method, apparatus, and non-transitory computer-readable medium described above may further include processes, features, means, or instructions for receiving, from the UE, an indication as to whether the DCI transmitted to update the subset of the set of TCI states was received. In some examples of the method, apparatus, and non-transitory computer-readable medium described above, the subset of the set of TCI states may be updated based on receiving the indication.

Some examples of the method, apparatus, and non-transitory computer-readable medium described above may further include processes, features, means, or instructions for transmitting an indication of a TCI state to the UE in a DCI message in a TTI, the TCI state indicating QCL relationships between antenna ports used for communicating with the UE in the TTI. In some examples of the method, apparatus, and non-transitory computer-readable medium described above, the TCI state may be associated with one or more reference signals, and the antenna ports used to transmit the one or more reference signals in the TTI may be quasi co-located with antenna ports used to transmit data to the UE in the TTI. In some examples of the method, apparatus, and non-transitory computer-readable medium described above, the one or more reference signals include SSBs, periodic CSI-RSs, aperiodic CSI-RSs, semi-persistent CSI-RSs, or any combination thereof.

In some examples of the method, apparatus, and non-transitory computer-readable medium described above, the TCI state may be associated with one or more reference signals, and the antenna ports used to transmit the one or more reference signals may be quasi co-located with antenna ports used to transmit control information to the UE in the TTI. In some examples of the method, apparatus, and non-transitory computer-readable medium described above, the one or more reference signals include SSBs, periodic CSI-RSs, aperiodic CSI-RSs, semi-persistent CSI-RSs, or any combination thereof.

In some examples of the method, apparatus, and non-transitory computer-readable medium described above, the DCI may be transmitted in a PDCCH. In some examples of the method, apparatus, and non-transitory computer-readable medium described above, the DCI may be transmitted in a MAC-CE in a PDCCH and a PDSCH.

DETAILED DESCRIPTION

Figure 1:
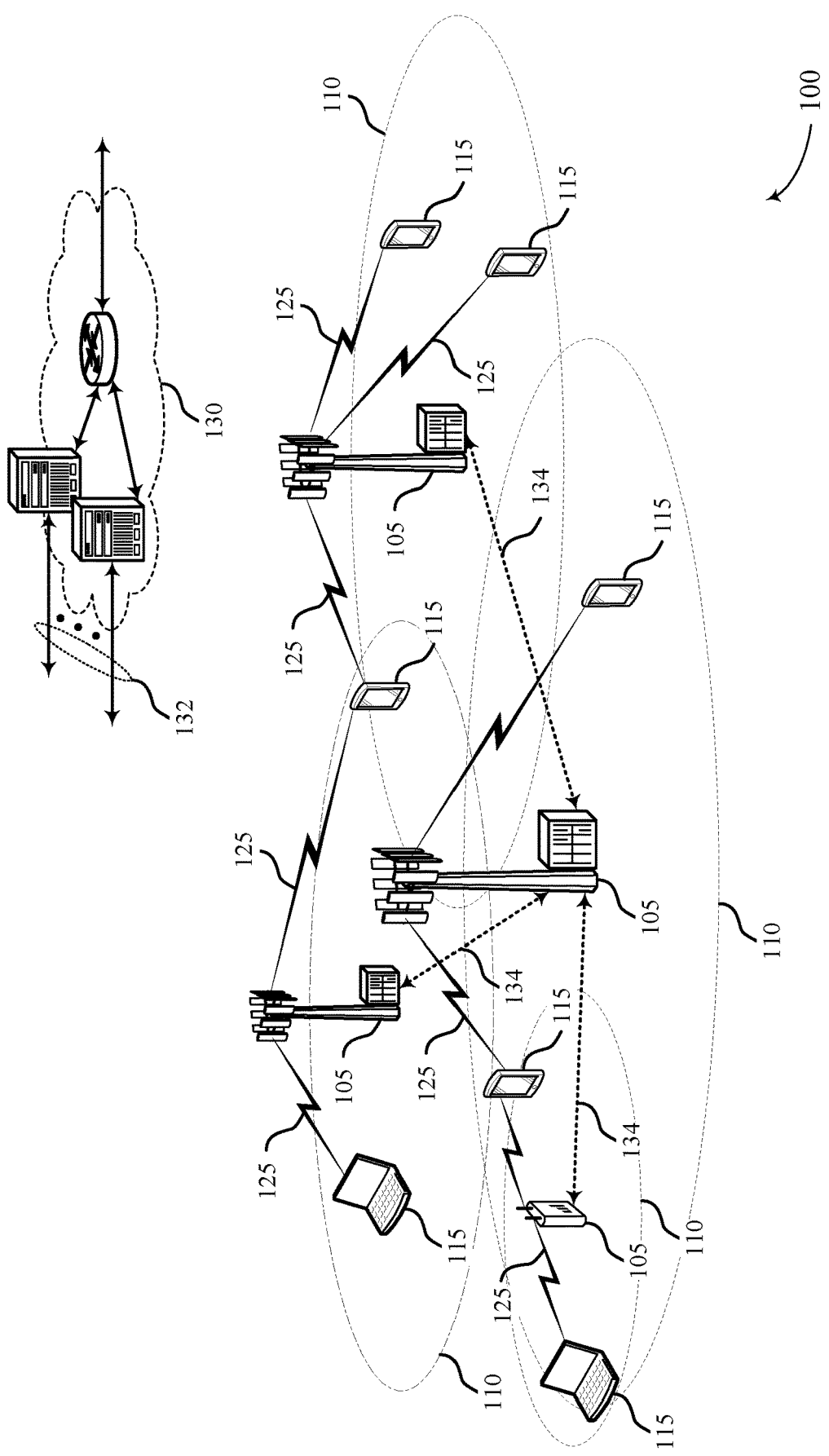
FIGS. 1 and 2 illustrate examples of wireless communications systems in accordance with aspects of the present disclosure.

In some wireless communications systems, a base station may communicate with a user equipment (UE) using multiple antennas. For example, a base station may transmit parallel data streams over respective antennas in order to increase throughput (e.g., as opposed to transmitting the data streams sequentially over the same antenna). Additionally, or alternatively, a base station may simultaneously transmit a given data stream over multiple antennas (e.g., to increase the diversity of the transmissions). In some cases, the use of multiple antennas may be based on the use of one or more antenna ports. An antenna port is a logical entity used to map data streams to antennas. A given antenna port may drive transmissions from one or more antennas (e.g., and resolve signal components received over one or more antennas). Each antenna port may be associated with a reference signal (e.g., which may allow the receiver to distinguish data streams associated with the different antenna ports in a received transmission).

Some antenna ports may be referred to as quasi co-located, meaning that the spatial parameters of a transmission on one antenna port may be inferred from the spatial parameters of another transmission on a different antenna port. Accordingly, a receiving device (e.g., a UE) may be able to perform channel estimation for demodulating data or control information received on a first set of antenna ports based on reference signals received on a second set of antenna ports that are quasi co-located with the first set of antenna ports. Thus, a quasi co-location (QCL) relationship between antenna ports may improve the chances that a UE may successfully decode a downlink transmission from a base station. In some cases, a base station may transmit, to a UE, an indication of which antenna ports are quasi co-located such that the UE may be able to identify additional reference signals to use for channel estimation.

In some aspects, a base station may configure a set of transmission configuration indication (TCI) states to use to indicate, to a UE, QCL relationships between antenna ports used for transmitting downlink signals to the UE. Each TCI state may be associated with a set of reference signals (e.g., synchronization signal blocks (SSBs) or different types of channel state information reference signals (CSI-RSs)), and the TCI state may indicate a QCL relationship between antenna ports used to transmit the set of reference signals and antenna ports used to transmit data or control information to a UE. As such, when a UE receives an indication of a particular TCI state from a base station (e.g., in downlink control information (DCI) in a transmission time interval (TTI)), the UE may identify that antenna ports used to transmit the reference signals associated with the TCI state are quasi co-located with antenna ports used to transmit data and control information to the UE. Thus, the UE may use the reference signals associated with the TCI state to perform channel estimation for demodulating data or control information received from the base station.

In order to limit the overhead associated with indicating a TCI state to a UE, a base station may be configured to indicate a limited number of TCI states to a UE. For example, the base station may configure M (e.g., 8) TCI states corresponding to different QCL relationships between antenna ports used for downlink communication with a UE, and the base station may use an N-bit indicator (e.g., a 3-bit indicator) to indicate a TCI state to a UE (e.g., where $M \geq 2^N$). In some cases, however, after a period of time, the originally configured TCI states may no longer correspond to suitable QCL relationships between antenna ports used for transmitting downlink signals to a UE. In such cases, a base station may be configured to use radio resource control (RRC) signaling or a media access control (MAC) control element (MAC-CE) to update the TCI states used to indicate QCL relationships between antenna ports to a UE. However, because channel conditions in a wireless communications system (e.g., in a millimeter wave (mmW) system) may change frequently, the use of RRC signaling or a MAC-CE for updating TCI states may be slow (e.g., static). Thus, the base station may not be able to dynamically adapt these TCI states to changing channel conditions in a wireless communications system, which may be detrimental to the throughput in the wireless communications system.

As described herein, a base station may support efficient techniques for dynamically updating a set of TCI states configured for indicating, to a UE, QCL relationships between antenna ports used for downlink communications with the UE. In particular, a base station may transmit downlink control information (DCI) to a UE to update a subset of TCI states configured for indicating QCL relationships between antenna ports used for communicating with the UE. Because DCI may be transmitted relatively frequently (e.g., relative to RRC or MAC-CE signaling), the base station may be able to dynamically adapt these TCI states used to indicate QCL relationships between antenna ports to a UE. A UE may receive the DCI and may update the corresponding TCI states such that the TCI states may correspond to updated QCL relationships between antenna ports as indicated in the DCI.

Aspects of the disclosure introduced above are described below in the context of a wireless communications system. Examples of processes and signaling exchanges that support dynamic TCI state updating are then described. Aspects of the disclosure are further illustrated by and described with reference to apparatus diagrams, system diagrams, and flowcharts that relate to dynamic TCI state updating.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Wireless communications system 100 may operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than ultra-high frequency (UHF) antennas. In some cases, this may facilitate use of antenna arrays within a UE 115. However, the propagation of EHF transmissions may be subject to even greater atmospheric attenuation and shorter range than super high frequency (SHF) or UHF transmissions. Techniques disclosed herein may be employed across transmissions that use one or more different frequency regions, and designated use of bands across these frequency regions may differ by country or regulating body.

In some cases, UEs 115 and base stations 105 may support retransmissions of data to increase the likelihood that data is received successfully. HARQ feedback is one technique of increasing the likelihood that data is received correctly over a communication link 125. HARQ may include the transmission of an acknowledgement (ACK) or a negative acknowledgement (NACK) by a receiving device to a transmitting device to indicate to the transmitting device whether a transmission was successfully received. HARQ may also include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams.

Different spatial layers may be associated with different antenna ports used for channel measurement and reporting. An antenna port is a logical entity used to map data streams to antennas. A given antenna port may drive transmissions from one or more antennas (e.g., and resolve signal components received over one or more antennas). Each antenna port may be associated with a reference signal (e.g., which may allow the receiver to distinguish different data streams associated with the different antenna ports in a received transmission). In some cases, some antenna ports may be referred to as quasi co-located, meaning that the spatial parameters associated with a transmission on one antenna port may be inferred from the spatial parameters associated with another transmission on a different antenna port.

Accordingly, if a first set of antenna ports is quasi co-located with a second set of antenna ports, a UE 115 may be able to perform channel estimation for demodulating data or control information received on the first set of antenna ports based on reference signals received on the second set of antenna ports. For example, the UE 115 may be able to determine a delay spread, a Doppler shift, etc. associated with a downlink transmission of data or control information on the first set of antenna ports based on reference signals received on the second set of antenna ports. The UE 115 may then use a channel estimate (i.e., determined based on performing channel estimation as described above) to correctly decode a downlink transmission from a base station 105. Thus, a QCL relationship between antenna ports used for downlink communications between a base station 105 and a UE 115 may improve the chances that UE 115 successfully decodes a downlink transmission from the base station 105. As such, a base station may transmit an indication of which antenna ports are quasi co-located to a UE 115 such that the UE 115 may be able to identify additional reference signals to use for channel estimation.

In wireless communications system 100, a base station 105 may configure a set of TCI states that correspond to different QCL relationships between antenna ports used for communication with a UE 115. A TCI state may be associated with a set of reference signals (e.g., SSBs or different types of CSI-RSs), and the TCI state may indicate a QCL relationship between antenna ports used to transmit these reference signals and antenna ports used to transmit data or control information to a UE 115. As such, when a UE 115 receives an indication of a particular TCI state from a base station 105 (e.g., in DCI in a TTI), the UE 115 may identify that antenna ports used to transmit the reference signals associated with the TCI state are quasi co-located with antenna ports used to transmit data and control information to the UE 115. Thus, the UE 115 may use the reference signals associated with the TCI state to perform channel estimation for demodulating data or control information received from the base station 105. For example, the UE 115 may determine a delay spread, Doppler shift, etc. associated with a transmission of data or control information based on the reference signals associated with the TCI state.

In order to limit the overhead associated with indicating a TCI state to a UE 115, a base station 105 may indicate a limited number of TCI states to a UE. For example, the base station 105 may configure M (e.g., 8) TCI states corresponding to different QCL relationships between antenna ports used for downlink communication with a UE 115. In addition, base station 105 may use an N-bit indicator (e.g., a 3-bit indicator) to indicate a TCI state to a UE 115 (e.g., where $M \geq 2^N$). In some cases, however, after a period of time, the originally configured TCI states may no longer correspond to suitable QCL relationships between antenna ports used for transmitting downlink signals to a UE 115. For instance, due to changing channel conditions, a base station 105 may identify a new beam for transmitting downlink signals to a UE 115, and the QCL relationships between antenna ports associated with this beam and antenna ports used to transmit reference signals to a UE 115 may change.

In such cases, a base station 105 may be configured to use RRC signaling or a MAC-CE to update the TCI states used to indicate QCL relationships between antenna ports to a UE 115. However, because channel conditions in a wireless communications system (e.g., in a mmW system) may change frequently, the use of RRC or MAC-CE signaling for updating TCI states may be slow (e.g., static). Thus, the base station 105 may not be able to dynamically adapt these TCI states to changing channel conditions in a wireless communications system, which may be detrimental to the throughput in the wireless communications system. Wireless communications system 100 may support efficient techniques for dynamically updating TCI states used to indicate, to a UE 115, QCL relationships between antenna ports used for communications between a base station 105 and the UE 115.

Figure 2:
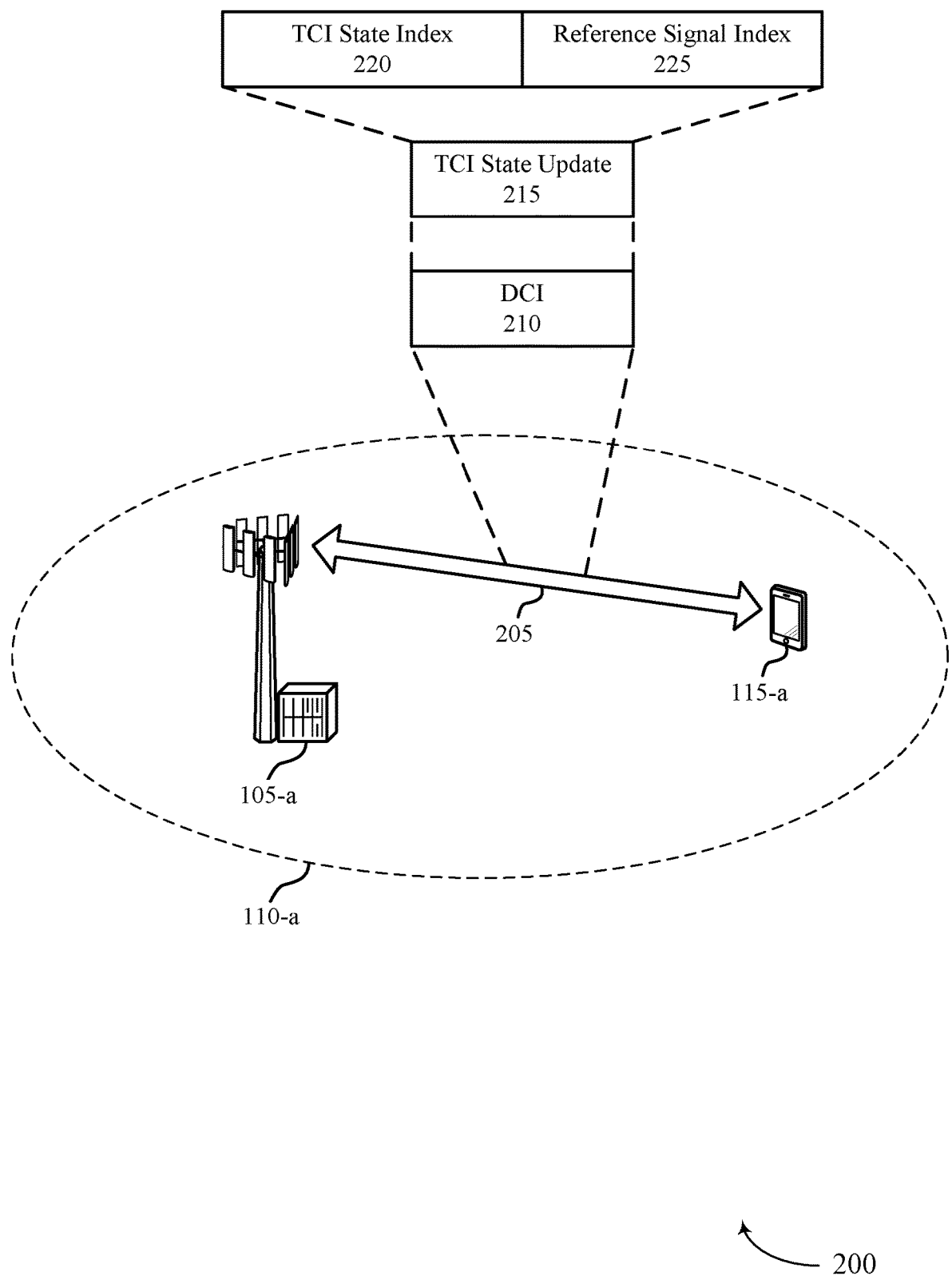

FIG. 2 illustrates an example of a wireless communications system 200 in accordance with various aspects of the present disclosure. Wireless communications system 200 includes base station 105-*a* and UE 115-*a*, which may be examples of the corresponding devices described with reference to FIG. 1. Base station 105-*a* may communicate with UEs 115 (including UE 115-*a*) within coverage area 110-*a*. For example, base station 105-*a* may communicate with UE 115-*a* on resources of a carrier 205. Wireless communications system 200 may implement aspects of wireless communications system 100. For example, wireless communications system may support efficient techniques for dynamically updating TCI states used to indicate, to a UE 115-*a*, QCL relationships between antenna ports used for downlink communications between a base station 105-*a* and the UE 115-*a*. In particular, base station 105-*a* may be configured to update TCI states using DCI.

As described with reference to FIG. 1, base station 105-*a* may configure a set of TCI states that correspond to different QCL relationships between antenna ports used for downlink communications with a UE 115-*a*. Base station 105-*a* may then use these TCI states to indicate, to UE 115-*a*, different QCL relationships between antenna ports used for downlink communications with UE 115-*a*. For example, base station 105-*a* may transmit an indication that a first set of antenna ports (used to transmit periodic CSI-RSs to UE 115-*a*) are quasi co-located with a second set of antenna ports used to transmit data to the UE 115-*a*. Accordingly, UE 115-*a* may perform channel estimation for demodulating the data received on the second set of antenna ports using the CSI-RSs received on the first set of antenna ports (e.g., in addition to demodulation reference signals (DMRSs) received on the second set of antenna ports).

In some cases, after a period of time, the configured set of TCI states may not indicate suitable QCL relationships between antenna ports used for downlink communications between base station 105-*a* and UE 115-*a* (e.g., due to changing channel conditions). Thus, using the techniques described herein, base station 105-*a* may determine to update a subset of the set of TCI states. As such, base station 105-*a* may transmit a TCI state update 215 in DCI 210 to UE 115-*a* to update the subset of configured TCI states (e.g., based on the current channel conditions). The TCI state update 215 may include a TCI state index 220 that identifies the TCI state being updated. Base station 105-*a* may configure, via RRC signaling, the subset of TCI states (e.g., M') that a base station 105-*a* may be able to update to limit the number of TCI states that may be updated dynamically. Accordingly, the TCI state index 220 may be indicated using a certain number of bits corresponding to the number of TCI states that may be updated dynamically (e.g., $\log_2$ M').

The TCI state update 215 may also include a reference signal index 225 that identifies an updated set of reference signals associated with the TCI state being updated and/or an updated set of QCL parameters associated with each of the reference signals (e.g., delay spread, Doppler shift). In one example, base station 105-*a* may transmit the TCI state update 215 using additional bits available in a DCI message (e.g., an uplink or a downlink grant). In another example, base station 105-*a* may transmit the TCI state update 215 in a dedicated DCI message 210 (e.g., dedicated for transmitting TCI state updates). Once UE 115-*a* receives the TCI state update 215, UE 115-*a* may activate the update by updating a table (e.g., a table available to the UE 115-a) that indicates a mapping between TCI states and QCL relationships between antenna ports used for communication with base station 105-a. In particular, UE 115-a may update the table such that the updated TCI states correspond to the updated QCL relationships indicated by the TCI state update 215.

Further, in some aspects, UE 115-a may be configured to transmit an indication to base station 105-a as to whether the DCI 210 including the TCI state update 215 was received. In other aspects, UE 115-a may be configured to refrain from transmitting an indication to base station 105-a as to whether the DCI 210 including the TCI state update 215 was received. And, in yet other aspects, UE 115-a may be configured to determine whether to transmit an indication to base station 105-a as to whether the DCI 210 including the TCI state update 215 was received based on properties associated with the TCI states being updated. The different aspects introduced above related to providing feedback on whether the DCI 210 including the TCI state update 215 was received are described in further detail below with reference to FIGS. 3A and 3B, which illustrate examples of TTIs 300 used to update TCI states in accordance with various aspects of the present disclosure.

Figure 3A:
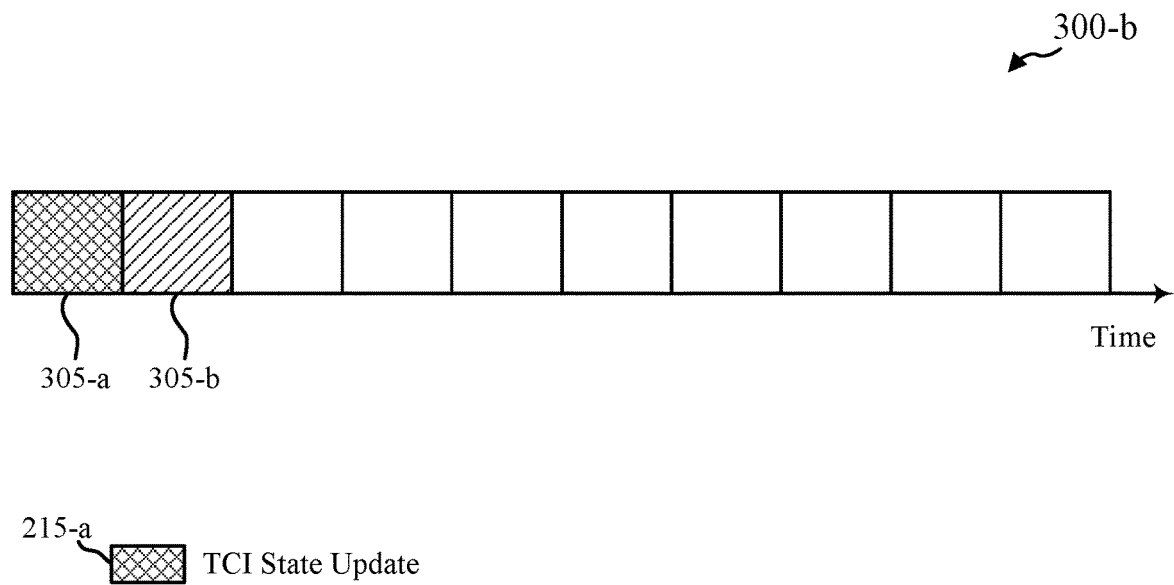
FIGS. 3A and 3B illustrate examples of TTIs used to update TCI states in accordance with aspects of the present disclosure.

In the example of FIG. 3A, UE 115-a may be configured to refrain from transmitting an indication to base station 105-a as to whether the DCI 210 including the TCI state update 215 was received. Or UE 115-a may determine to refrain from transmitting an indication to base station 105-a as to whether the DCI 210 including the TCI state update 215 was received based on properties associated with the one or more TCI states being updated. For instance, if the TCI states (e.g., all of the TCI states) being updated are used to indicate QCL relationships between antenna ports used to transmit reference signals and antenna ports used to transmit data (i.e., the TCI states are associated with a data beam), UE 115-a may determine to refrain from transmitting an indication to base station 105-a as to whether the DCI 210 including the TCI state update 215 was received. In addition, if the TCI state update is minor (e.g., used to update QCL parameters of one reference signal in a set of reference signals associated with a TCI state), UE 115-a may determine to refrain from transmitting an indication to base station 105-a as to whether the DCI 210 including the TCI state update 215 was received.

Accordingly, when UE 115-a receives the TCI state update 215-a in TTI 305-a, UE 115-a may activate the update in TTI 305-b (i.e., the UE 115-a may activate the update in a following TTI). Thus, the time taken to activate the TCI state update 215-a may depend on whether the UE 115-a is configured to or determines to transmit the indication to base station 105-a as to whether the DCI 210 including the TCI state update 215-a was received. For example, the time taken to activate the TCI state update 215-a (e.g., one or four TTIs) may be configured by a base station 105-a using RRC signaling based on whether the UE 115-a is configured to or determines to transmit the indication to base station 105-a.

In this example, if UE 115-a fails to receive a TCI state update 215 transmitted by base station 105-a, UE 115-a may continue to communicate with the base station 105-a based on previously configured TCI states. As such, if base station 105-a transmits an indication of a particular TCI state that was intended to be updated using the TCI state update 215, UE 115-a may identify QCL relationships between antenna ports used for downlink communications with base station 105-a based on the previously configured TCI state. In such cases, UE 115-a may not be able to determine an appropriate channel estimate for demodulating data received from base station 105-a (e.g., because UE 115-a may be using a previously configured TCI state to identify QCL relationships between antenna ports used for downlink communications with base station 105-a). Since UE 115-a may not be able to demodulate data received from base station 105-a, base station 105-a may determine that UE 115-a failed to receive the TCI state update 215 (e.g., based on receiving one or more NACKs from UE 115-a associated with data transmissions to UE 115-a). Accordingly, base station 105-a may retransmit the TCI state update 215 to UE 115-a.

Figure 3B:
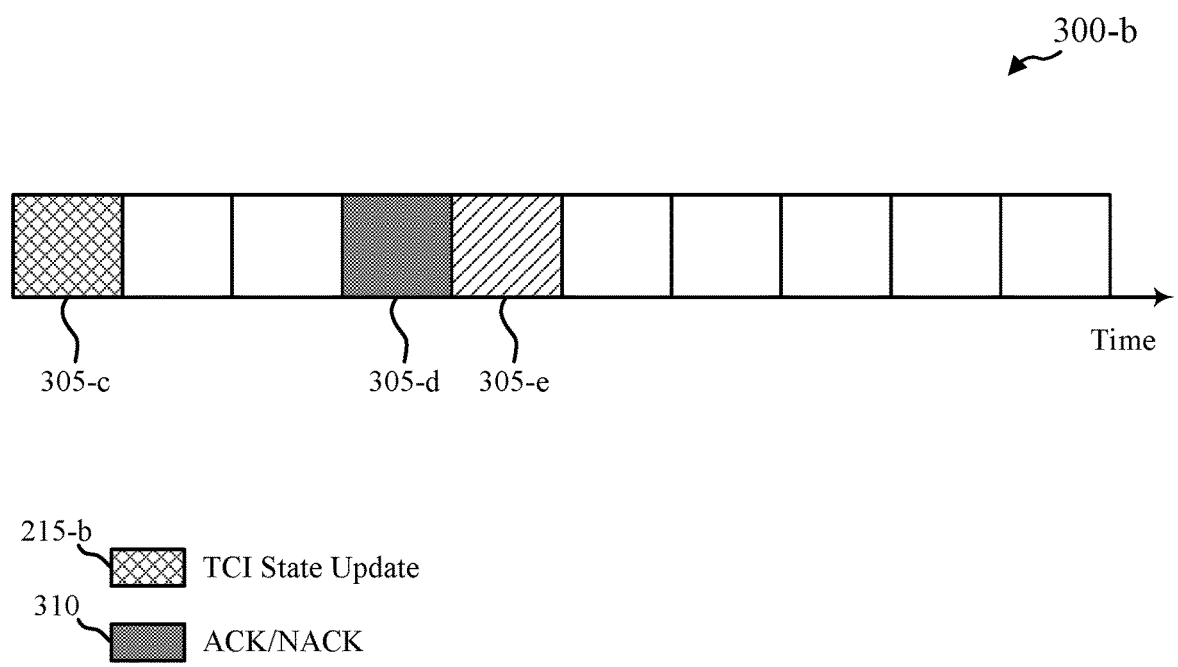

In the example of FIG. 3B, UE 115-a may be configured to transmit an indication to base station 105-a as to whether the DCI 210 including the TCI state update 215 was received. Or UE 115-a may determine to transmit an indication to base station 105-a as to whether the DCI 210 including the TCI state update 215 was received based on properties associated with the TCI state being updated. For instance, if at least one of the TCI states being updated is used to indicate QCL relationships between antenna ports used to transmit reference signals and antenna ports used to transmit control information (i.e., the TCI state is associated with a control beam), UE 115-a may determine to transmit an indication to base station 105-a as to whether the DCI 210 including the TCI state update 215 was received. In addition, if the TCI state update is substantial (e.g., used to update multiple reference signals associated with a TCI state and the QCL parameters associated with these reference signals), UE 115-a may determine to refrain from transmitting an indication to base station 105-a as to whether the DCI 210 including the TCI state update 215 was received.

Accordingly, when UE 115-a receives the TCI state update 215-b in TTI 305-c, UE 115-a may transmit an indication, to base station 105-a in TTI 305-d, that the DCI 210 including the TCI state update 215-b was received. UE 115-a may then activate the update in TTI 305-e (i.e., the UE 115-a may activate the update after transmitting the indication in TTI 305-d). Thus, the time taken to activate the TCI state update 215 may depend on whether the UE 115-a is configured to or determines to transmit the indication to base station 105-a as to whether the DCI 210 including the TCI state update 215-b was received. For example, the time taken to activate the TCI state update 215-b (e.g., one or four TTIs) may be configured by a base station 105-a using RRC signaling based on whether the UE 115-a is configured to or determines to transmit the indication to base station 105-a.

In this example, UE 115-a may transmit an ACK/NACK 310 to base station 105-a to indicate whether the DCI 210 including the TCI state update 215-b was received. In some cases, UE 115-a may be configured to transmit dedicated ACK/NACK feedback to base station 105-a to indicate whether the DCI 210 including the TCI state update 215-b was received (e.g., ACK/NACK feedback exclusively used for indicating whether the DCI 210 including the TCI state update 215-b was received). In other cases, UE 115-a may implicitly indicate, to base station 105-a, whether the DCI 210 including the TCI state update 215-b was received. For instance, UE 115-a may transmit ACK/NACK feedback for data received in a data channel from base station 105-a. Because the downlink transmission may be scheduled in DCI 210 (e.g., in a downlink grant in DCI 210), base station 105-a may determine that DCI 210 was received by UE 115-a if the base station 105-a receives ACK/NACK feedback for the data (e.g., regardless of whether base station 105-a receives an ACK or a NACK for the data).

Figure 4:
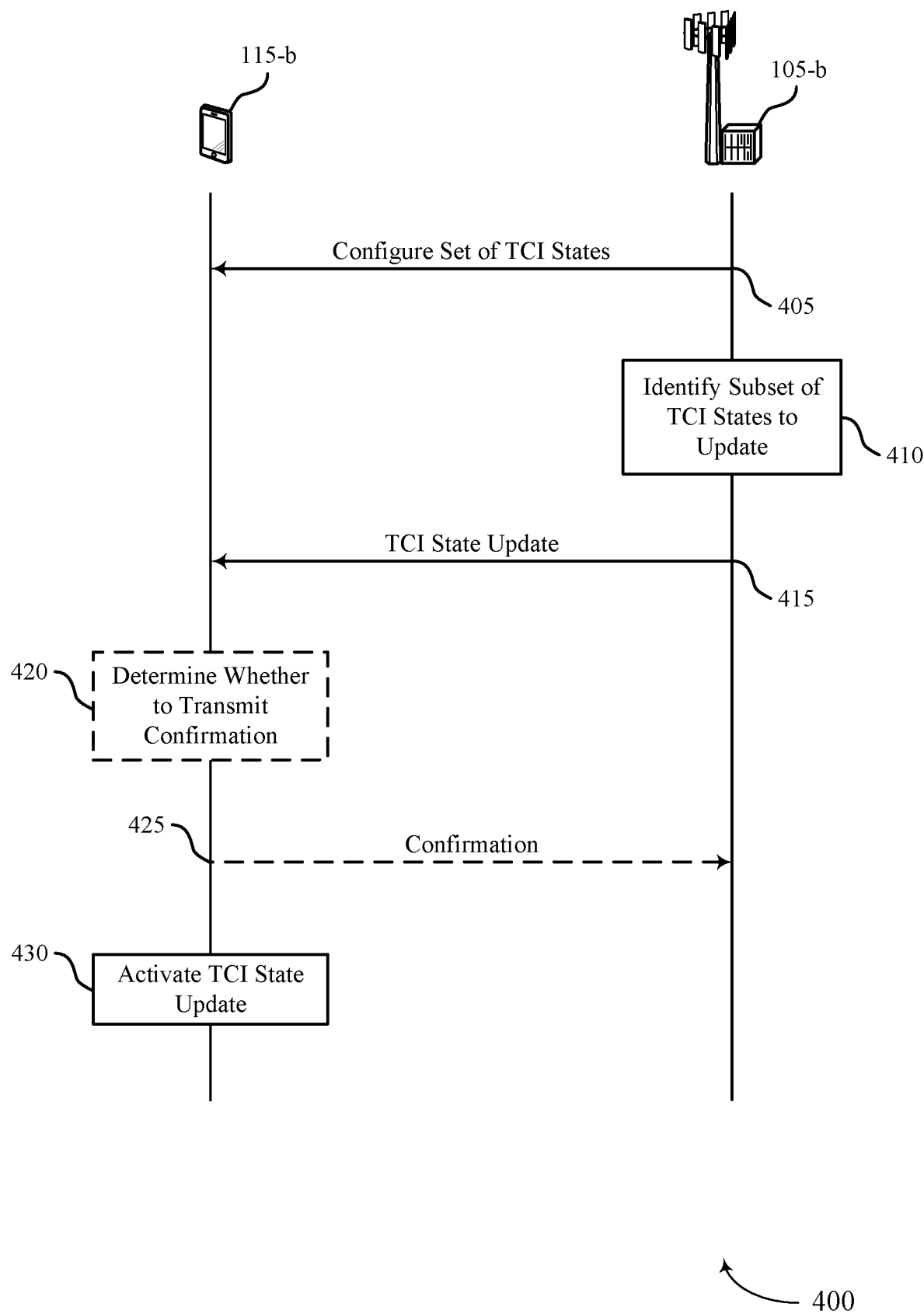
FIG. 4 illustrates an example of a process flow in accordance with aspects of the present disclosure.

FIG. 4 illustrates an example of a process flow 400 in accordance with various aspects of the present disclosure. Process flow 400 illustrates aspects of techniques performed by base station 105-b, which may be an example of a base station 105 described with reference to FIGS. 1-3. Process flow 400 also illustrates aspects of techniques performed by a UE 115-b, which may be an example of a UE 115 described with reference to FIGS. 1-3

At 405, base station 105-b may transmit, to UE 115-b, an indication of a set of TCI states that indicate QCL relationships between antenna ports used for communicating with UE 115-b. The indication may be transmitted in RRC signaling or in a MAC-CE. At 410, base station 105-b may identify a subset of the set of TCI states to update. Accordingly, at 415, base station 105-b may transmit DCI to UE 115-b that identifies the subset of the set of TCI states to update and the updated QCL relationships corresponding to the TCI states being updated. In some cases, base station 105-b may transmit the DCI in a PDCCH. In other cases, base station 105-b may transmit the DCI in a MAC-CE in a PDCCH and in a PDSCH.

UE 115-b may receive the DCI indicating the update to the subset of the set of TCI states, and, at 420, UE 115-b may determine whether to transmit, to base station 105-b, an indication as to whether the DCI including the TCI state update was received. For instance, UE 115-b may determine whether to transmit the indication based on a configuration at the UE 115-b indicating whether to transmit the indication or based on properties associated with the subset of the set of TCI states to be updated. In some examples, UE 115-b may determine to refrain from transmitting the indication as to whether the DCI was received, and UE 115-b may refrain from transmitting the indication. In other examples, UE 115-b may determine to transmit the indication as to whether the DCI was received, and, at 425, UE 115-b may transmit the indication. At 430, UE 115-b may activate the TCI state update for communication with base station 105-b.

UE 115-b may then communicate with base station 105-b based on the updated subset of the set of TCI states. For example, if UE 115-a receives an indication of an updated TCI state in a DCI, UE 115-a may identify updated QCL relationships between antenna ports based on the updated TCI state. Specifically, UE 115-a may identify one or more reference signals associated with the TCI state, and the antenna ports used to transmit the one or more reference signals may be quasi co-located with antenna ports used to transmit data or control information to the UE 115-b. The one or more reference signals may include SSBs, periodic CSI-RSs, aperiodic CSI-RSs, or semi-persistent CSI-RSs. Thus, UE 115-b may perform channel estimation based on the one or more reference signals associated with the TCI state. UE 115-b may then demodulate the data or control information received from base station 105-b based on the channel estimation.

Figure 5:
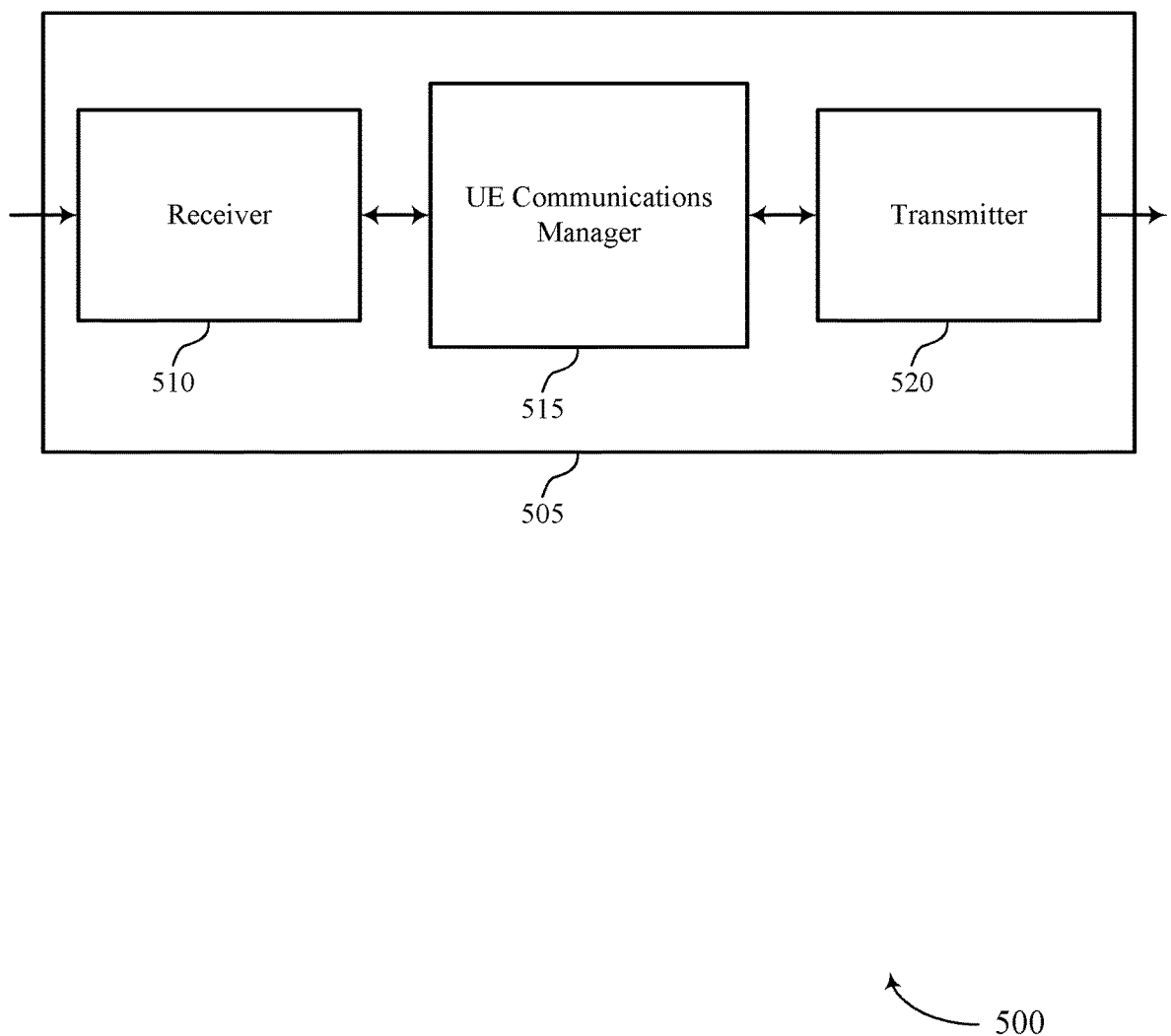
FIGS. 5-7 show block diagrams of a device in accordance with aspects of the present disclosure.

FIG. 5 shows a block diagram 500 of a wireless device 505 in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to dynamic TCI state updating, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may identify a set of TCI states that indicate QCL relationships between antenna ports used for communicating with a base station, receive, from the base station, DCI indicating an update to a subset of the set of TCI states, the updated subset of the set of TCI states indicating updated QCL relationships between antenna ports used for communicating with the base station, and communicate with the base station based on the updated subset of the set of TCI states.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
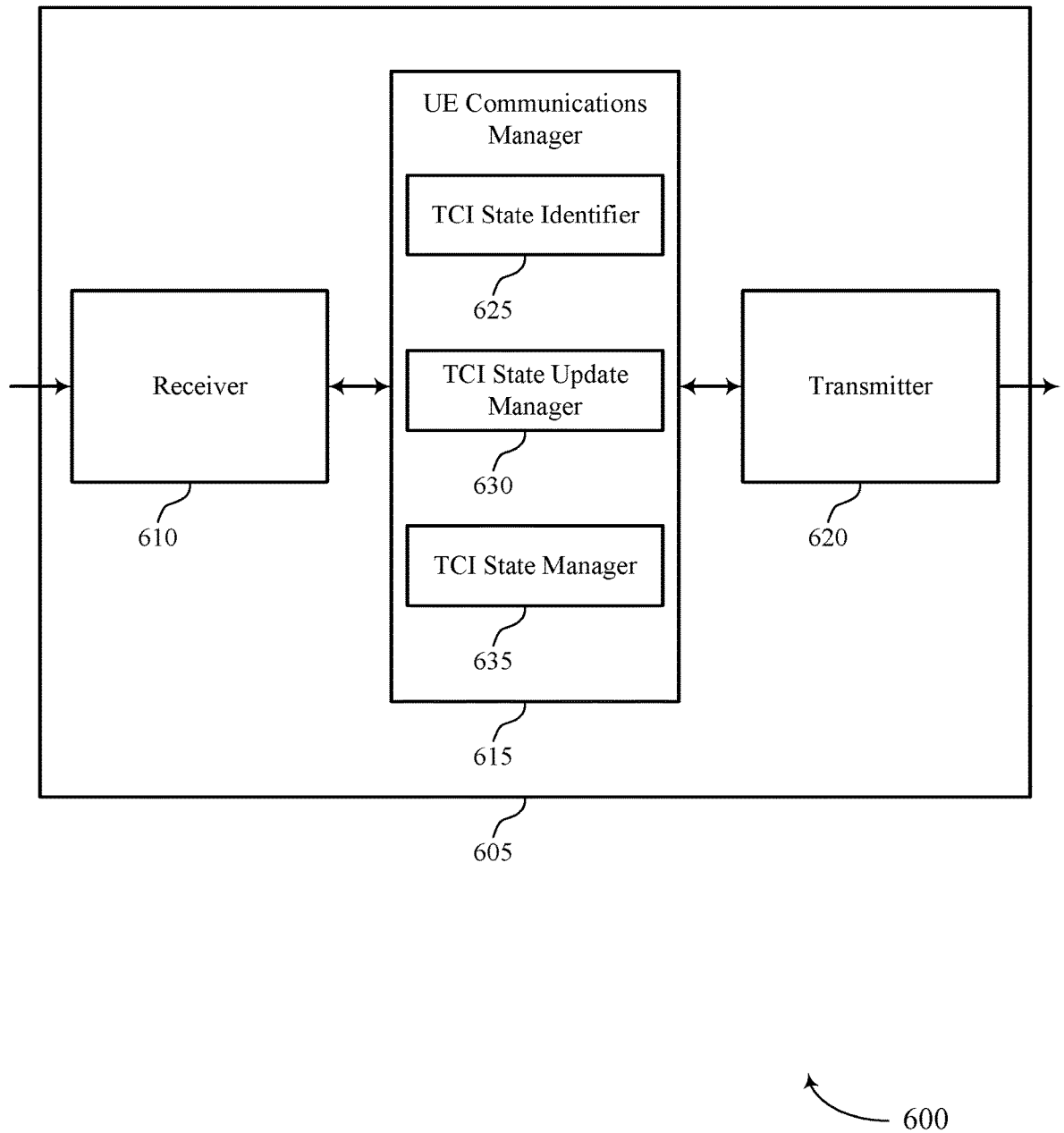

FIG. 6 shows a block diagram 600 of a wireless device 605 in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to dynamic TCI state updating, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may include TCI state identifier 625, TCI state update manager 630, and TCI state manager 635.

TCI state identifier 625 may identify a set of TCI states that indicate QCL relationships between antenna ports used for communicating with a base station. In some cases, TCI state identifier 625 may receive, from the base station, an indication of the set of TCI states that indicate QCL relationships between antenna ports used for communicating with the base station. In some cases, the indication is received in RRC signaling or in a MAC-CE. TCI state update manager 630 may receive, from the base station, DCI indicating an update to a subset of the set of TCI states, the updated subset of the set of TCI states indicating updated QCL relationships between antenna ports used for communicating with the base station. In some cases, the DCI is received in a PDCCH. In some cases, the DCI is received in a MAC-CE in a PDCCH and a PDSCH.

TCI state manager 635 may communicate with the base station based on the updated subset of the set of TCI states. In some cases, TCI state manager 635 may receive, from the base station, an indication of a TCI state in a DCI message in a TTI, the TCI state indicating QCL relationships between antenna ports used for communicating with the base station in the TTI. In some cases, the TCI state is associated with one or more reference signals, and the antenna ports used to transmit the one or more reference signals in the TTI are quasi co-located with antenna ports used to transmit data to the UE in the TTI. In some cases, the TCI state is associated with one or more reference signals, and the antenna ports used to transmit the one or more reference signals are quasi co-located with antenna ports used to transmit control information to the UE in the TTI. In some cases, the one or more reference signals include SSBs, periodic CSI-RSs, aperiodic CSI-RSs, semi-persistent CSI-RSs, or any combination thereof.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
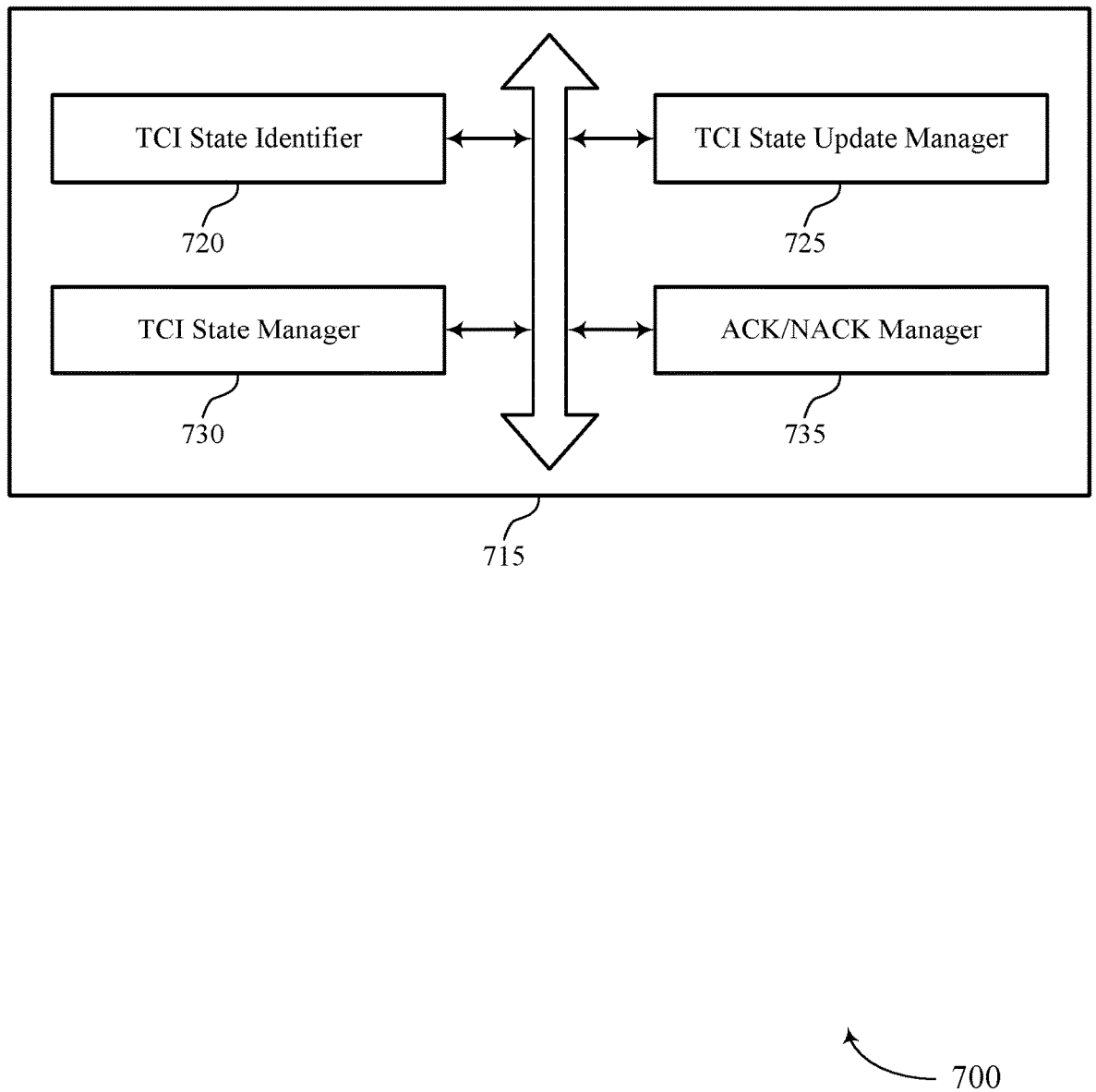

FIG. 7 shows a block diagram 700 of a UE communications manager 715 in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include TCI state identifier 720, TCI state update manager 725, TCI state manager 730, and ACK/NACK manager 735. Each of these modules may communicate, directly or indirectly, with one another (e.g., via one or more buses).

TCI state identifier 720 may identify a set of TCI states that indicate QCL relationships between antenna ports used for communicating with a base station. In some cases, TCI state identifier 720 may receive, from the base station, an indication of the set of TCI states that indicate QCL relationships between antenna ports used for communicating with the base station. In some cases, the indication is received in RRC signaling or in a MAC-CE. TCI state update manager 725 may receive, from the base station, DCI indicating an update to a subset of the set of TCI states, the updated subset of the set of TCI states indicating updated QCL relationships between antenna ports used for communicating with the base station. In some cases, the DCI is received in a PDCCH. In some cases, the DCI is received in a MAC-CE in a PDCCH and a PDSCH.

TCI state manager 730 may communicate with the base station based on the updated subset of the set of TCI states. In some cases, TCI state manager 730 may receive, from the base station, an indication of a TCI state in a DCI message in a TTI, the TCI state indicating QCL relationships between antenna ports used for communicating with the base station in the TTI. In some cases, the TCI state is associated with one or more reference signals, and the antenna ports used to transmit the one or more reference signals in the TTI are quasi co-located with antenna ports used to transmit data to the UE in the TTI. In some cases, the TCI state is associated with one or more reference signals, and the antenna ports used to transmit the one or more reference signals are quasi co-located with antenna ports used to transmit control information to the UE in the TTI. In some cases, the one or more reference signals include SSBs, periodic CSI-RSs, aperiodic CSI-RSs, semi-persistent CSI-RSs, or any combination thereof.

ACK/NACK manager 735 may determine whether to transmit an indication as to whether the DCI was received, the determining based on the subset of the set of TCI states to be updated. In some cases, ACK/NACK manager 735 may transmit, to the base station, an indication as to whether the DCI was received based on the determining. In some cases, ACK/NACK manager 735 may refrain from transmitting, to the base station, an indication as to whether the DCI was received based on the determining. In some cases, a time period associated with activating the updated subset of the set of TCI states is based on the determining.

Figure 8:
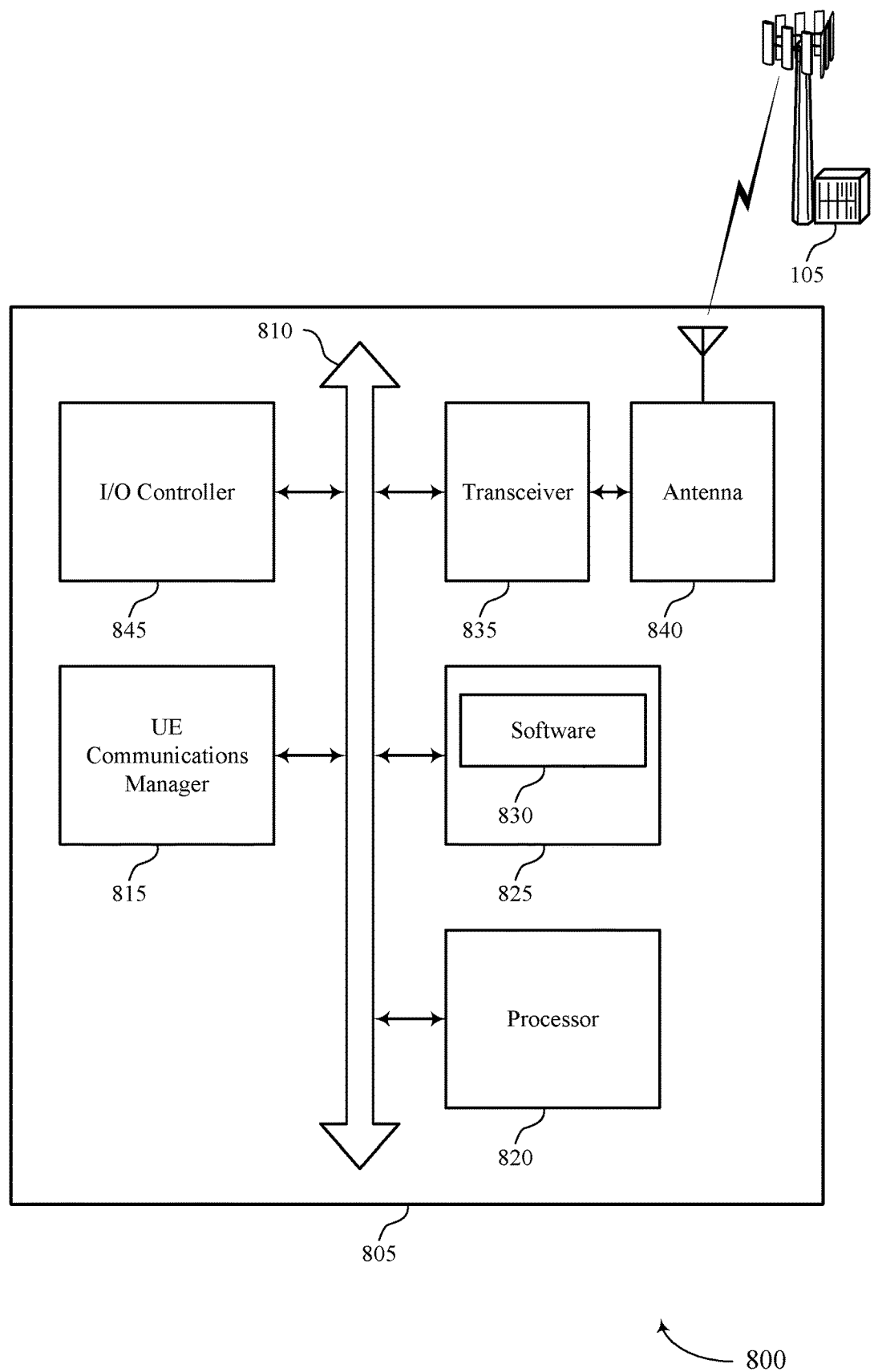
FIG. 8 illustrates a block diagram of a system including a user equipment (UE) in accordance with aspects of the present disclosure.

FIG. 8 shows a diagram of a system 800 including a device 805 in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting dynamic TCI state updating).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support dynamic TCI state updating. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
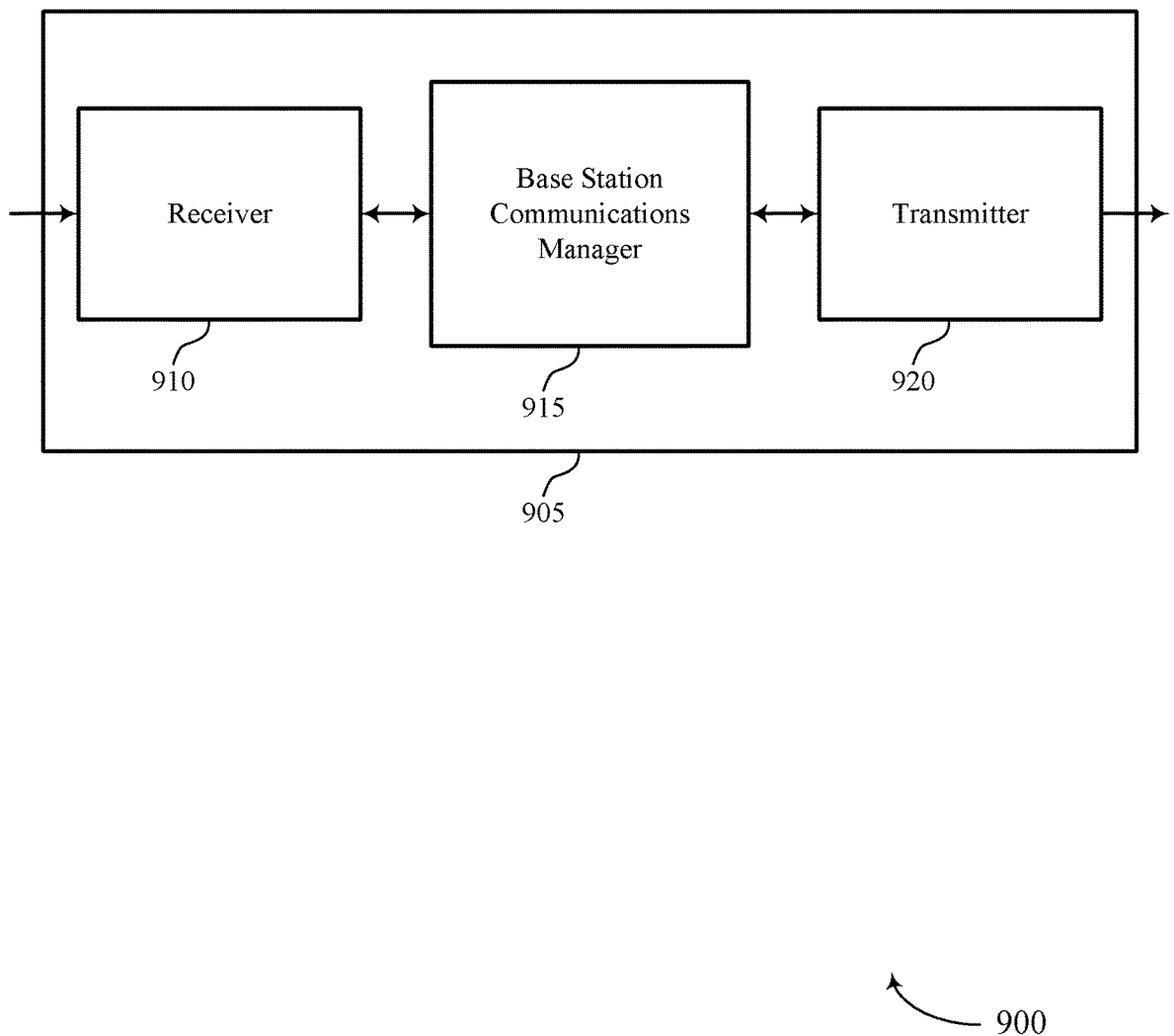
FIGS. 9-11 show block diagrams of a device in accordance with aspects of the present disclosure.

FIG. 9 shows a block diagram 900 of a wireless device 905 in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to dynamic TCI state updating, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may identify a set of TCI states that indicate QCL relationships between antenna ports used for communicating with a UE, determine a subset of the set of TCI states to update, the updated subset of the set of TCI states indicating updated QCL relationships between antenna ports used for communicating with the UE, and transmit DCI to the UE that identifies the subset of the set of TCI states to update based on the determining.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
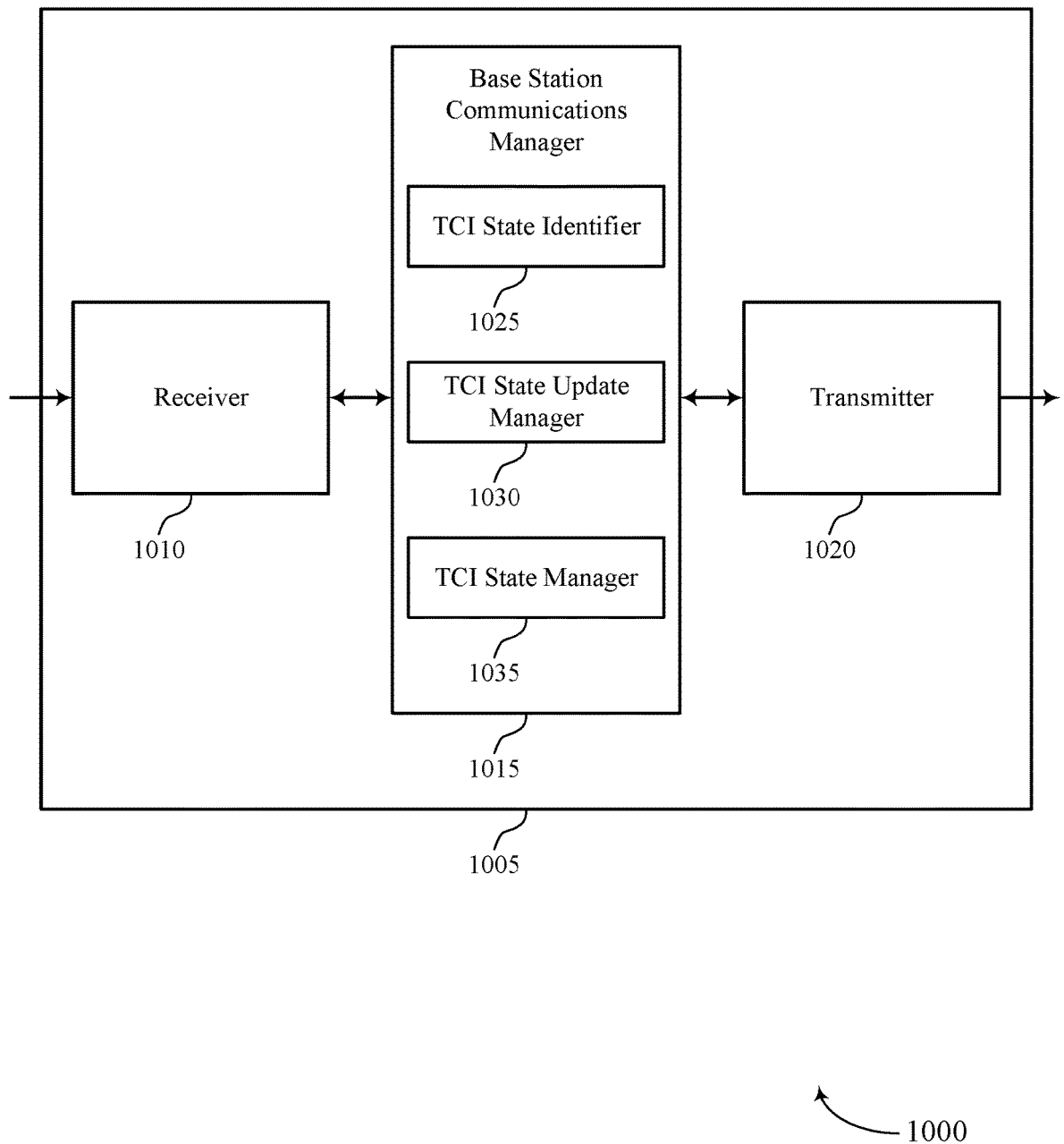

FIG. 10 shows a block diagram 1000 of a wireless device 1005 in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to dynamic TCI state updating, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may include TCI state identifier 1025, TCI state update manager 1030, and TCI state manager 1035.

TCI state identifier 1025 may identify a set of TCI states that indicate QCL relationships between antenna ports used for communicating with a UE. In some cases, TCI state identifier 1025 may transmit, to the UE, an indication of the set of TCI states that indicate QCL relationships between antenna ports used for communicating with the UE. In some cases, the indication is transmitted in RRC signaling or in a MAC-CE. TCI state update manager 1030 may determine a subset of the set of TCI states to update, the updated subset of the set of TCI states indicating updated QCL relationships between antenna ports used for communicating with the UE. TCI state manager 1035 may transmit DCI to the UE that identifies the subset of the set of TCI states to update based on the determining In some cases, TCI state manager 1035 may transmit an indication of a TCI state to the UE in a DCI message in a TTI, the TCI state indicating QCL relationships between antenna ports used for communicating with the UE in the TTI. In some cases, the TCI state is associated with one or more reference signals, and the antenna ports used to transmit the one or more reference signals in the TTI are quasi co-located with antenna ports used to transmit data to the UE in the TTI. In some cases, the TCI state is associated with one or more reference signals, and the antenna ports used to transmit the one or more reference signals are quasi co-located with antenna ports used to transmit control information to the UE in the TTI. In some cases, the one or more reference signals include SSBs, periodic CSI-RSs, aperiodic CSI-RSs, semi-persistent CSI-RSs, or any combination thereof. In some cases, the DCI is transmitted in a PDCCH. In some cases, the DCI is transmitted in a MAC-CE in a PDCCH and a PDSCH.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
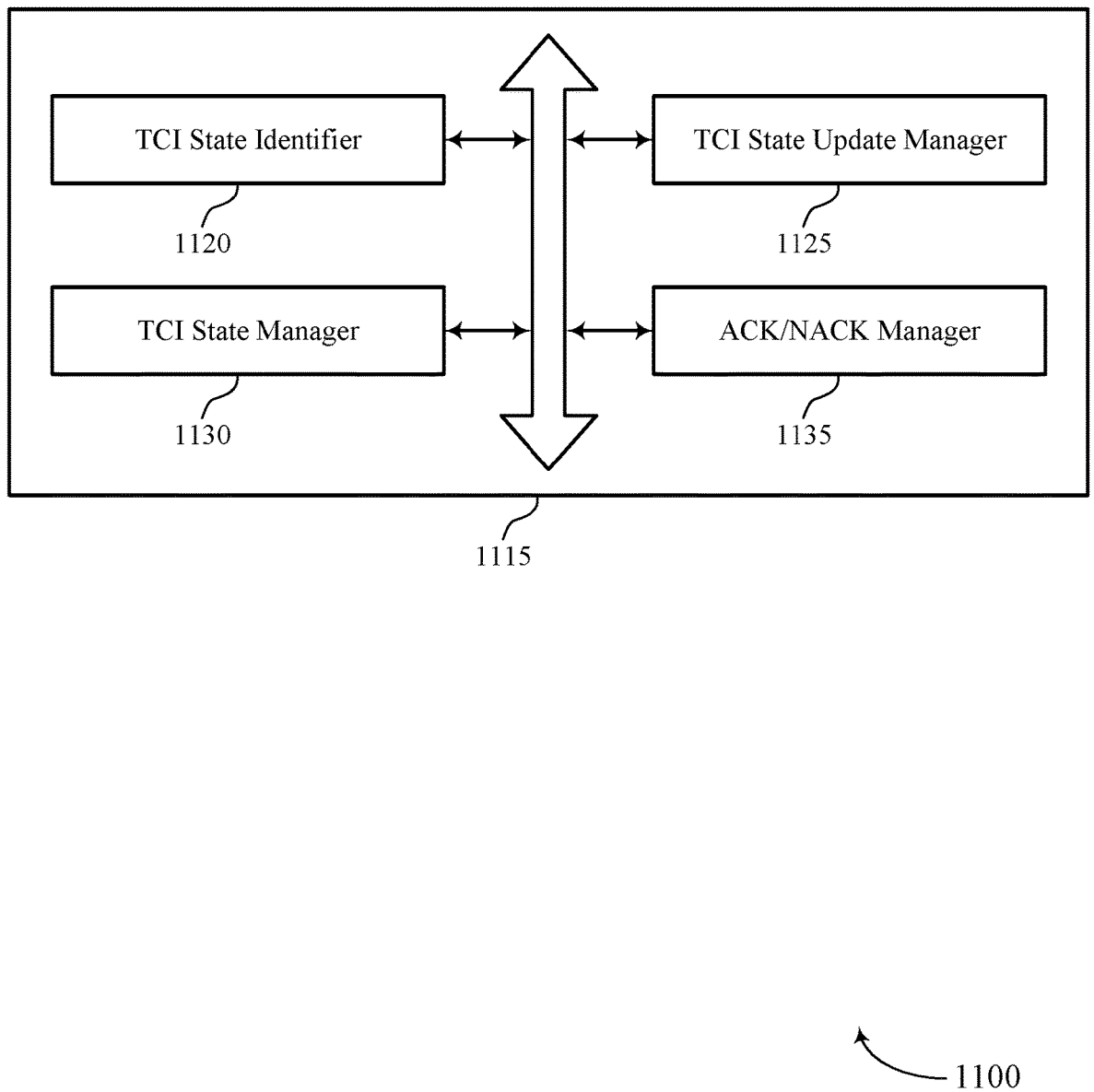

FIG. 11 shows a block diagram 1100 of a base station communications manager 1115 in accordance with aspects of the present disclosure. The base station communications manager 1115 may be an example of aspects of a base station communications manager 1215 described with reference to FIGS. 9, 10, and 12. The base station communications manager 1115 may include TCI state identifier 1120, TCI state update manager 1125, TCI state manager 1130, and ACK/NACK manager 1135. Each of these modules may communicate, directly or indirectly, with one another (e.g., via one or more buses).

TCI state identifier 1120 may identify a set of TCI states that indicate QCL relationships between antenna ports used for communicating with a UE and transmit, to the UE, an indication of the set of TCI states that indicate QCL relationships between antenna ports used for communicating with the UE. In some cases, the indication is transmitted in RRC signaling or in a MAC-CE. TCI state update manager 1125 may determine a subset of the set of TCI states to update, the updated subset of the set of TCI states indicating updated QCL relationships between antenna ports used for communicating with the UE. TCI state manager 1130 may transmit DCI to the UE that identifies the subset of the set of TCI states to update based on the determining. ACK/NACK manager 1135 may receive, from the UE, an indication as to whether the DCI transmitted to update the subset of the set of TCI states was received. In some cases, the subset of the set of TCI states is updated based on receiving the indication.

In some cases, TCI state manager 1130 may transmit an indication of a TCI state to the UE in a DCI message in a TTI, the TCI state indicating QCL relationships between antenna ports used for communicating with the UE in the TTI. In some cases, the TCI state is associated with one or more reference signals, and the antenna ports used to transmit the one or more reference signals in the TTI are quasi co-located with antenna ports used to transmit data to the UE in the TTI. In some cases, the TCI state is associated with one or more reference signals, and the antenna ports used to transmit the one or more reference signals are quasi co-located with antenna ports used to transmit control information to the UE in the TTI. In some cases, the one or more reference signals include SSBs, periodic CSI-RSs, aperiodic CSI-RSs, semi-persistent CSI-RSs, or any combination thereof. In some cases, the DCI is transmitted in a PDCCH. In some cases, the DCI is transmitted in a MAC-CE in a PDCCH and a PDSCH.

Figure 12:
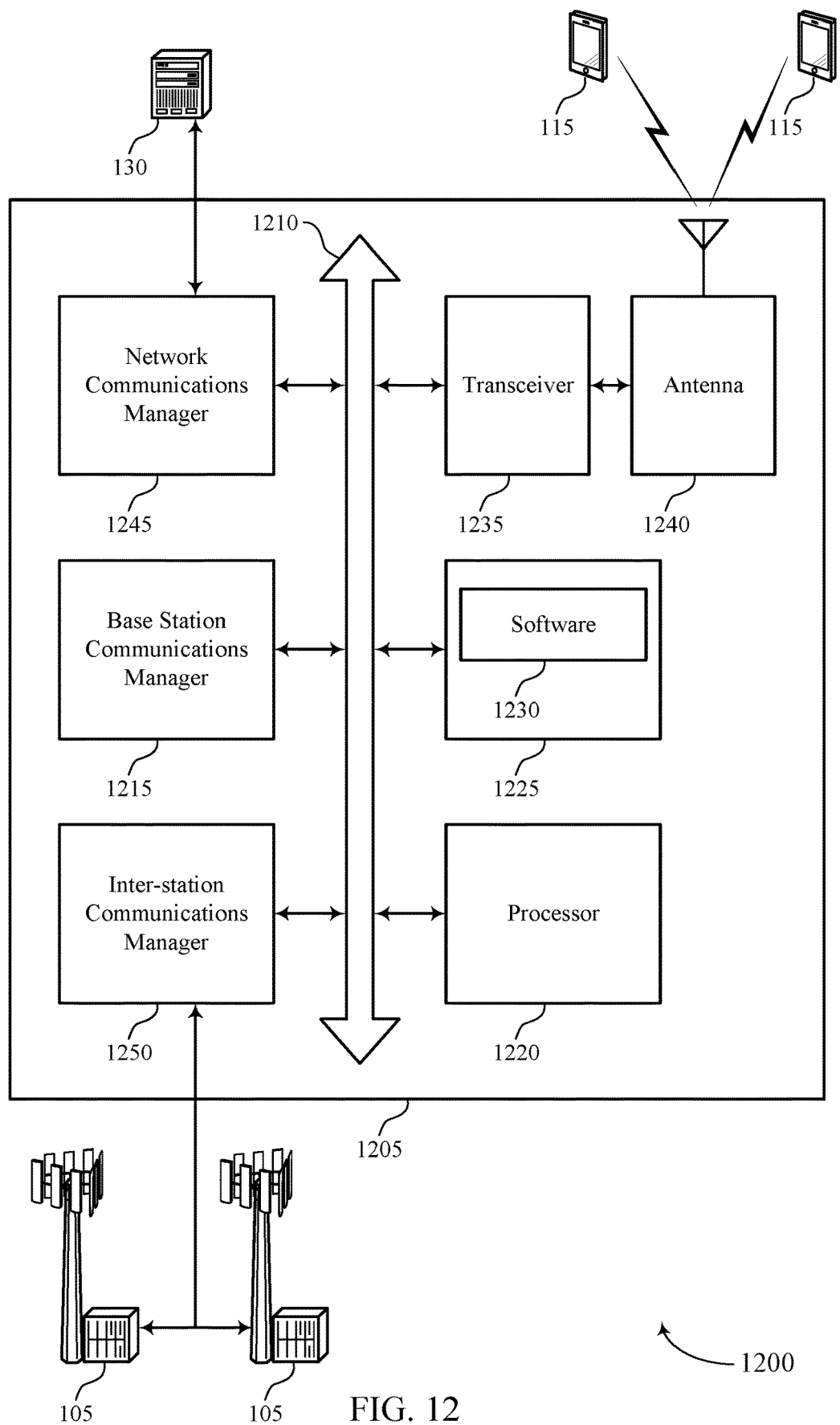
FIG. 12 illustrates a block diagram of a system including a base station in accordance with aspects of the present disclosure.

FIG. 12 shows a diagram of a system 1200 including a device 1205 in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting dynamic TCI state updating).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support dynamic TCI state updating. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
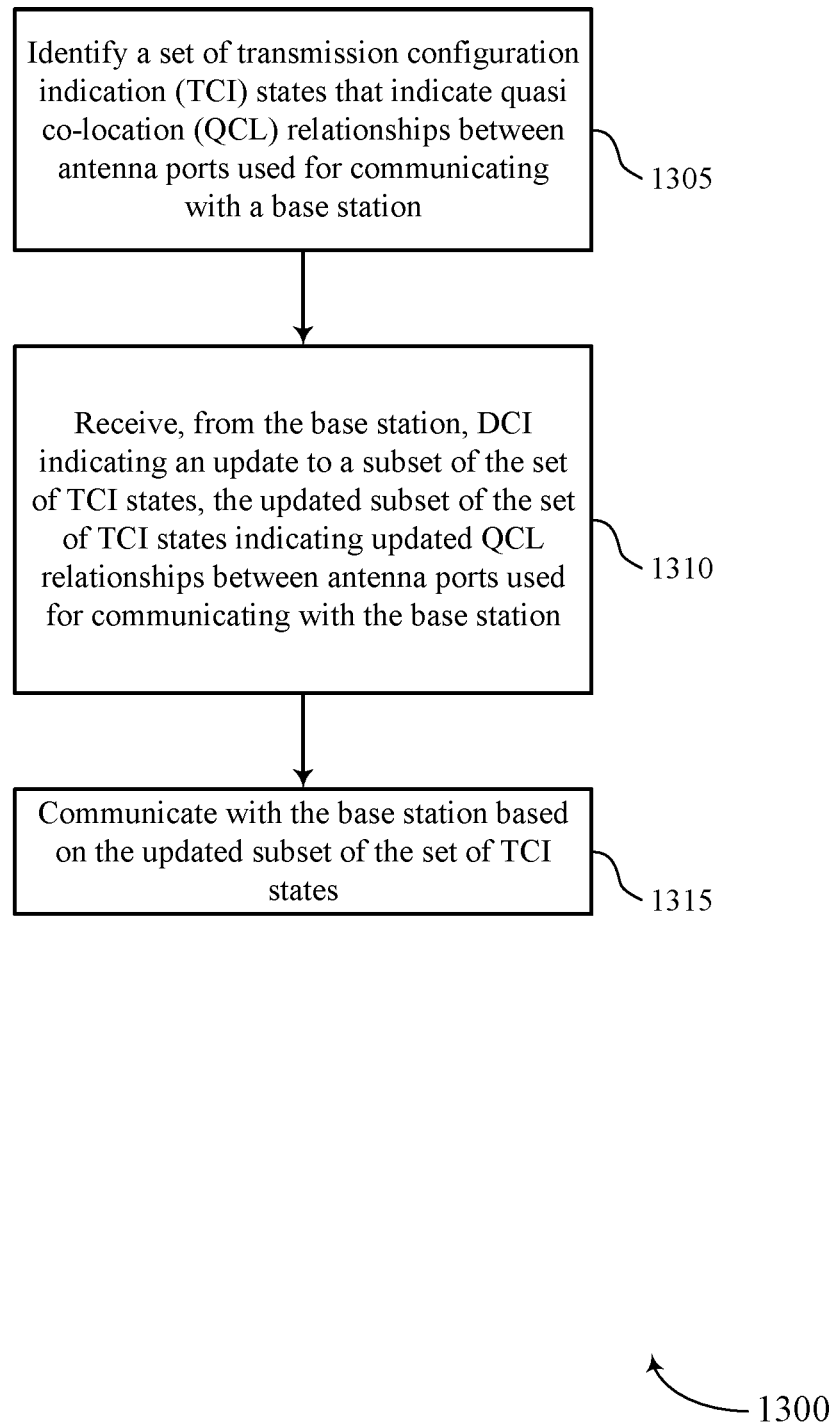
FIGS. 13 and 14 illustrate methods in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally, or alternatively, the UE 115 may perform aspects of the functions described below using special-purpose hardware.

At 1305 the UE 115 may identify a set of TCI states that indicate QCL relationships between antenna ports used for communicating with a base station. The operations of 1305 may be performed according to the methods described herein. In certain examples, aspects of the operations of 1305 may be performed by a TCI state identifier as described with reference to FIGS. 5 through 8.

At 1310 the UE 115 may receive, from the base station, DCI indicating an update to a subset of the set of TCI states, the updated subset of the set of TCI states indicating updated QCL relationships between antenna ports used for communicating with the base station. The operations of 1310 may be performed according to the methods described herein. In certain examples, aspects of the operations of 1310 may be performed by a TCI state update manager as described with reference to FIGS. 5 through 8.

At 1315 the UE 115 may communicate with the base station based on the updated subset of the set of TCI states. The operations of 1315 may be performed according to the methods described herein. In certain examples, aspects of the operations of 1315 may be performed by a TCI state manager as described with reference to FIGS. 5 through 8.

Figure 14:
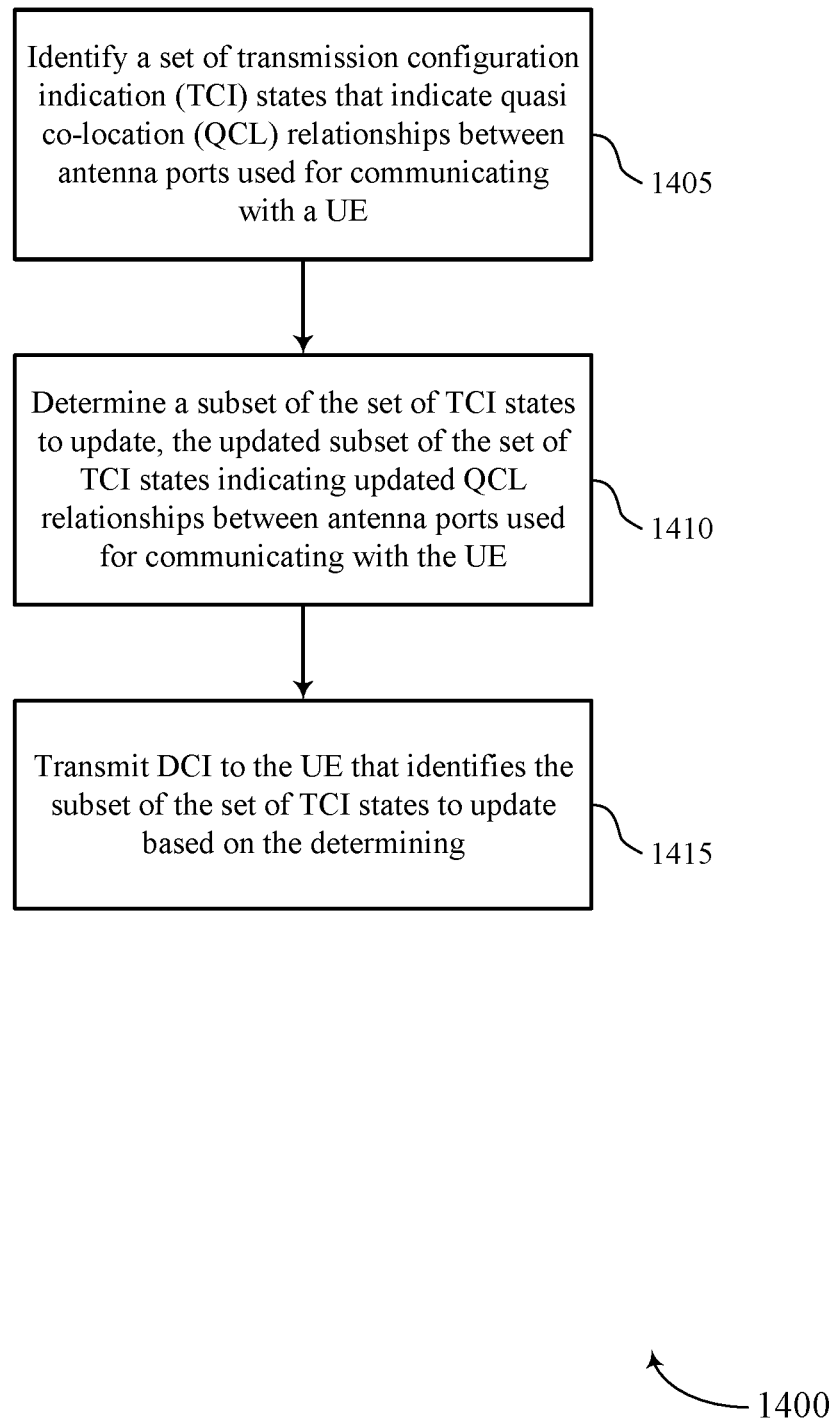

FIG. 14 shows a flowchart illustrating a method 1400 in accordance with aspects of the present disclosure. The operations of method 1400 may be implemented by a base station 105 or its components as described herein. For example, the operations of method 1400 may be performed by a base station communications manager as described with reference to FIGS. 9 through 12. In some examples, a base station 105 may execute a set of codes to control the functional elements of the device to perform the functions described below. Additionally, or alternatively, the base station 105 may perform aspects of the functions described below using special-purpose hardware.

At 1405 the base station 105 may identify a set of TCI states that indicate QCL relationships between antenna ports used for communicating with a UE. The operations of 1405 may be performed according to the methods described herein. In certain examples, aspects of the operations of 1405 may be performed by a TCI state identifier as described with reference to FIGS. 9 through 12.

At 1410 the base station 105 may determine a subset of the set of TCI states to update, the updated subset of the set of TCI states indicating updated QCL relationships between antenna ports used for communicating with the UE. The operations of 1410 may be performed according to the methods described herein. In certain examples, aspects of the operations of 1410 may be performed by a TCI state update manager as described with reference to FIGS. 9 through 12.

At 1415 the base station 105 may transmit DCI to the UE that identifies the subset of the set of TCI states to update based on the determining. The operations of 1415 may be performed according to the methods described herein. In certain examples, aspects of the operations of 1415 may be performed by a TCI state manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples.

A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may contain random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a set of transmission configuration indication (TCI) states that indicate quasi co-location (QCL) relationships between antenna ports used for communicating with a base station;
   receiving, from the base station, downlink control information (DCI) indicating an update to a subset of the set of TCI states, the updated subset of the set of TCI states indicating updated QCL relationships between the antenna ports used for communicating with the base station;
   determining whether to transmit an indication as to whether the DCI was received, the determining based at least in part on the subset of the set of TCI states to be updated; and
   communicating with the base station based at least in part on the updated subset of the set of TCI states.

2. The method of claim 1, further comprising:
   receiving, from the base station, an indication of the set of TCI states that indicate QCL relationships between the antenna ports used for communicating with the base station.

3. The method of claim 2, wherein the indication of the set of TCI states is received in radio resource control (RRC) signaling or in a media access control (MAC) control element (MAC-CE).

4. The method of claim 1, further comprising:
   transmitting, to the base station, the indication as to whether the DCI was received based at least in part on the determining.

5. The method of claim 1, further comprising:
   refraining from transmitting, to the base station, the indication as to whether the DCI was received based at least in part on the determining.

6. The method of claim 1, wherein a time period associated with activating the updated subset of the set of TCI states is based at least in part on the determining.

7. The method of claim 1, further comprising:
   receiving, from the base station, an indication of a TCI state in a DCI message in a transmission time interval (TTI), the TCI state indicating QCL relationships between the antenna ports used for communicating with the base station in the TTI.

8. The method of claim 7, wherein the TCI state is associated with one or more reference signals, and the antenna ports used to transmit the one or more reference signals in the TTI are quasi co-located with antenna ports used to transmit data to the UE in the TTI.

9. The method of claim 8, wherein the one or more reference signals comprise synchronization signal blocks (SSBs), periodic channel state information reference signals (CSI-RSs), aperiodic CSI-RSs, semi-persistent CSI-RSs, or any combination thereof.

10. The method of claim 7, wherein the TCI state is associated with one or more reference signals, and the antenna ports used to transmit the one or more reference signals are quasi co-located with antenna ports used to transmit control information to the UE in the TTI.

11. The method of claim 10, wherein the one or more reference signals comprise synchronization signal blocks (SSBs), periodic channel state information reference signals (CSI-RSs), aperiodic CSI-RSs, semi-persistent CSI-RSs, or any combination thereof.

12. The method of claim 1, wherein the DCI is received in a physical downlink control channel (PDCCH).

13. The method of claim 1, wherein the DCI is received in a media access control (MAC) control element (MAC-CE) in a physical downlink control channel (PDCCH) and a physical downlink shared channel (PDSCH).

14. A method for wireless communication at a base station, comprising:
    identifying a set of transmission configuration indication (TCI) states that indicate quasi co-location (QCL) relationships between antenna ports used for communicating with a user equipment (UE);
    determining a subset of the set of TCI states to update, the updated subset of the set of TCI states indicating updated QCL relationships between antenna ports used for communicating with the UE;
    transmitting downlink control information (DCI) to the UE that identifies the subset of the set of TCI states to update based at least in part on the determining; and
    receiving, from the UE, an indication as to whether the DCI transmitted to update the subset of the set of TCI states was received.

15. The method of claim 14, further comprising:
    transmitting, to the UE, an indication of the set of TCI states that indicate QCL relationships between antenna ports used for communicating with the UE.

16. The method of claim 15, wherein the indication of the set of TCI states is transmitted in radio resource control (RRC) signaling or in a media access control (MAC) control element (MAC-CE).

17. The method of claim 14, wherein the subset of the set of TCI states is updated based at least in part on receiving the indication.

18. The method of claim 14, further comprising:
    transmitting an indication of a TCI state to the UE in a DCI message in a transmission time interval (TTI), the TCI state indicating QCL relationships between antenna ports used for communicating with the UE in the TTI.

19. The method of claim 18, wherein the TCI state is associated with one or more reference signals, and the antenna ports used for communicating with the UE in the TTI are quasi co-located with antenna ports used to transmit data to the UE in the TTI.

20. The method of claim 19, wherein the one or more reference signals comprise synchronization signal blocks (SSBs), periodic channel state information reference signals (CSI-RSs), aperiodic CSI-RSs, semi-persistent CSI-RSs, or any combination thereof.

21. The method of claim 18, wherein the TCI state is associated with one or more reference signals, and the antenna ports used for communicating with the UE in the TTI are quasi co-located with antenna ports used to transmit control information to the UE in the TTI.

22. The method of claim 21, wherein the one or more reference signals comprise synchronization signal blocks (SSBs), periodic channel state information reference signals (CSI-RSs), aperiodic CSI-RSs, semi-persistent CSI-RSs, or any combination thereof.

23. The method of claim 14, wherein the DCI is transmitted in a physical downlink control channel (PDCCH).

24. The method of claim 14, wherein the DCI is transmitted in a media access control (MAC) control element (MAC-CE) in a physical downlink control channel (PDCCH) and a physical downlink shared channel (PDSCH).

25. An apparatus for wireless communication at a user equipment (UE), comprising:

a processor;

memory in electronic communication with the processor; and instructions stored in the memory and executable by the processor to cause the apparatus to:

identify a set of transmission configuration indication (TCI) states that indicate quasi co-location (QCL) relationships between antenna ports used for communicating with a base station;

receive, from the base station, downlink control information (DCI) indicating an update to a subset of the set of TCI states, the updated subset of the set of TCI states indicating updated QCL relationships between the antenna ports used for communicating with the base station;

determine whether to transmit an indication as to whether the DCI was received, the determining based at least in part on the subset of the set of TCI states to be updated; and communicate with the base station based at least in part on the updated subset of the set of TCI states.

26. The apparatus of claim 25, wherein the instructions are further executable by the processor to cause the apparatus to:

receive, from the base station, an indication of the set of TCI states that indicate QCL relationships between the antenna ports used for communicating with the base station.

27. An apparatus for wireless communication at a base station, comprising:

a processor;

memory in electronic communication with the processor; and instructions stored in the memory and executable by the processor to cause the apparatus to:

identify a set of transmission configuration indication (TCI) states that indicate quasi co-location (QCL) relationships between antenna ports used for communicating with a user equipment (UE);

determine a subset of the set of TCI states to update, the updated subset of the set of TCI states indicating updated QCL relationships between antenna ports used for communicating with the UE;

transmit downlink control information (DCI) to the UE that identifies the subset of the set of TCI states to update based at least in part on the determining; and receive, from the UE, an indication as to whether the DCI transmitted to update the subset of the set of TCI states was received.

28. The apparatus of claim 27, wherein the instructions are further executable by the processor to cause the apparatus to:

transmit, to the UE, an indication of the set of TCI states that indicate QCL relationships between antenna ports used for communicating with the UE.

* * * * *